(12) United States Patent
Norrie

(10) Patent No.: US 8,285,884 B1
(45) Date of Patent: Oct. 9, 2012

(54) DATA AGGREGATION SYSTEM AND METHOD FOR DESKEWING DATA AT SELECTABLE DATA RATES

(75) Inventor: Christopher I. W. Norrie, San Jose, CA (US)

(73) Assignee: Integrated Device Technology Inc., San Jose, CA (US)

(*) Notice: Subject to any disclaimer, the term of this patent is extended or adjusted under 35 U.S.C. 154(b) by 955 days.

(21) Appl. No.: 12/264,184

(22) Filed: Nov. 3, 2008

(51) Int. Cl.
*G06F 3/00* (2006.01)
*G06F 1/04* (2006.01)

(52) U.S. Cl. .............. 710/14; 710/52; 713/503
(58) Field of Classification Search .......... None
See application file for complete search history.

(56) References Cited

U.S. PATENT DOCUMENTS

| | | |
|---|---|---|
| 6,628,679 B1 | 9/2003 | Talarek |
| 6,690,757 B1 | 2/2004 | Bunton et al. |
| 6,865,231 B1 | 3/2005 | Bunton et al. |
| 6,961,347 B1 | 11/2005 | Bunton et al. |
| 6,985,502 B2 | 1/2006 | Bunton et al. |
| 7,010,607 B1 | 3/2006 | Bunton et al. |
| 7,082,504 B2 | 7/2006 | Rojas et al. |
| 7,092,629 B2 | 8/2006 | Bunton et al. |
| 7,197,100 B2 | 3/2007 | Bunton et al. |
| 7,230,549 B1 | 6/2007 | Woodral et al. |
| 7,242,736 B2 | 7/2007 | Schanke et al. |
| 7,599,459 B2 * | 10/2009 | Okuyama .............. 375/372 |
| 2007/0150762 A1 * | 6/2007 | Sharma et al. ......... 713/300 |
| 2007/0177701 A1 | 8/2007 | Thanigasalam |

* cited by examiner

*Primary Examiner* — Alan Chen
(74) *Attorney, Agent, or Firm* — Kenneth Glass; Stanley J. Pawlik; Glass & Associates

(57) ABSTRACT

A deskew module of a receiver includes deskew units, each of which includes a data aggregation module for selecting a data rate for receiving symbols of a corresponding data stream. The deskew unit includes a data aggregation module that aggregates a predetermined number of the symbols in one or more clock cycles of a clock signal based on the data rate. The predetermined number of symbols is the same for each data rate selectable by the data aggregation module. The data aggregation module outputs the aggregated symbols to a deskew buffer of the deskew unit in a clock cycle of a clock signal. The deskew buffer deskews symbols received from the data aggregation module and outputs the deskewed symbols.

23 Claims, 11 Drawing Sheets

DATA AGGREGATION SYSTEM AND METHOD FOR DESKEWING DATA AT SELECTABLE DATA RATES

CROSS-REFERENCE TO RELATED APPLICATIONS

The present patent application is related to U.S. patent application Ser. No. 12/188,195 entitled "System and Method for Deskewing Data Transmitted through Data Lanes" filed on Aug. 7, 2008, and U.S. patent application Ser. No. 12/264,158 entitled "Multi-Queue System and Method for Deskewing Symbols in Data Streams" filed on even date herewith, each of which is incorporated herein by reference in its entirety.

BACKGROUND

In some types of communications systems, a transmitter converts a sequence of data symbols into multiple serial data streams and transmits the serial data streams over multiple data lanes to a receiver by using a transmit clock signal. The receiver reconstructs the transmit clock signal of the transmitter for each data stream, converts data in each data stream into data symbols based on the reconstructed clock signal of the data stream, and stores the data symbols of each data stream into a corresponding elastic buffer based on the reconstructed clock signal of the data stream. Although the reconstructed clock signals have the same average frequency as the transmit clock signal over a sufficiently long time period, the frequency of each reconstructed clock signal may independently drift away from the average frequency in shorter time periods because of changing conditions in the data lanes.

Because of the frequency variations in the reconstructed clock signals, the data rates of the data streams may differ over shorter time periods. To compensate for the different rates of the data streams, the transmitter periodically inserts a skip ordered set containing control symbols into each data steam. In turn, the receiver selectively adds or deletes control symbols in the skip ordered sets, as is appropriate, and stores each skip ordered set of a data stream into the elastic buffer corresponding to the data stream. Further, the receiver reads data symbols of each data stream from the elastic buffers and stores the data symbols of each data stream into a corresponding deskew circuit by using a receiver clock signal. The frequency of the receiver clock signal is approximately the same as the frequency of the transmit clock signal but has an average frequency that may differ slightly from the average frequency of the transmit clock signal. Because of different propagation delays in the receiver (e.g., static skew) and as a result of the receiver adding or deleting control symbols in skip ordered sets (e.g., dynamic skew), the data symbols stored in the deskew circuits may be misaligned from each other. Nonetheless, the receiver aligns the data symbols stored in the deskew circuits based on the receiver clock signal and reconstructs the sequence of data symbols from the aligned data symbols.

In some communication systems, each of the deskew circuits receives one symbol per clock cycle and is capable of deskewing one symbol per clock cycle. In other communication systems, each of the deskew circuits receives a pair of symbols per clock cycle and is capable of deskewing two symbols per clock cycle. In these communication systems, design and manufacture of the receiver is complicated by wire interconnects in the deskew circuits and wire interconnects between the elastic buffers and the deskew circuits. In particular, the number of wire interconnects needed for receiving and deskewing a pair of symbols per clock cycle is substantially greater than the number of wire interconnects needed for receiving and deskewing a single symbol per clock cycle. As a result, routing the wire interconnects in the receiver takes a considerable amount of time in a design cycle of the receiver and has a higher likelihood of creating timing problems late in the design cycle. Moreover, the receiver is typically implemented in a semiconductor chip and the wire interconnects consume a considerable amount of die area and power in the semiconductor chip.

In light of the above, a need exists for an improved system and method for deskewing multiple symbols of a data stream in a clock cycle. A further need exists for reducing the design cycle of a receiver capable of receiving and deskewing multiple symbols of a data stream in a clock cycle. An additional need exists for reducing size and power consumption of deskew circuits capable of receiving and deskewing multiple symbols of a data stream in a clock cycle.

SUMMARY

In various embodiments, a communication system includes a transmitter that receives a sequence of symbols, distributes the symbols among serial data streams, and transmits the data streams to a receiver of the communication system. The receiver receives the data streams and includes a deskew module corresponding to each data stream that receives the data stream at a data rate. The deskew module includes a data aggregation module for aggregating symbols of the data stream and a corresponding deskew buffer for deskewing symbols of the data stream. The data aggregation module aggregates a number of symbols of the data stream in one or more clock cycles of a clock signal based on the data rate at which the data aggregation module receives the data stream. Moreover, the number of clock cycles needed to aggregate the number of symbols depends upon the data the rate of the data stream. The data aggregation module provides the aggregated symbols to the corresponding deskew buffer in a clock cycle of the clock signal. Moreover, the data aggregation module provides the same number of aggregated symbols to the deskew buffer regardless of the data rate of the data stream. The deskew module aligns symbols across the data streams by deskewing symbols stored in deskew buffers and generates an output data stream based on the deskewed symbols. The output data stream represents the sequence of symbols received by the transmitter.

Because the deskew buffer of each deskew module receives the same number of symbols in a clock cycle of the clock signal regardless of the data rate of the data stream received by the deskew module, the number and complexity of wire interconnects in the deskew module are reduced. Further, the size and complexity of logic circuits in the deskew module are reduced. As a result, a design cycle for designing the deskew module is reduced and timing issues are avoided late in the design cycle. Moreover, size and power consumption of the deskew module are reduced in embodiments in which the deskew module is implemented in an integrated circuit.

A data aggregation module, in accordance with one embodiment, includes inputs configured to receive a first symbol and a second symbol of a data stream at a data rate. The second symbol follows the first symbol in the data stream. The data aggregation module further includes a data aggregation unit coupled to the inputs and configured to select a mode of operation for the data aggregation unit based on the data rate. The data aggregation unit is configurable to operate in a first mode for aggregating the first symbol and the second symbol in multiple clock cycles of a clock signal. Additionally, the data aggregation module includes a data buffer coupled to the data aggregation unit and at least one of the inputs. The data buffer is configured to store the first symbol based on the clock signal if the selected mode is the first mode. Additionally, the data aggregation unit is configurable to operate in a second mode for aggregating the first symbol and the second symbol in a clock cycle of the clock signal. The data aggregation unit is further configured to output both the first symbol and the second symbol in a clock cycle of the clock signal.

A system, in accordance with one embodiment, includes a compensation buffer, a data aggregation module, and a deskew buffer. The data aggregation module is coupled to the compensation buffer and the deskew buffer. The compensation buffer is configured to output a first symbol and a second symbol of a data stream at a data rate. The second symbol follows the first symbol in the data stream. The data aggregation module includes inputs configured to receive the first symbol and the second symbol at the data rate. Additionally, the data aggregation module includes a data aggregation unit coupled to the inputs and configured to select a mode of operation for the data aggregation unit based on the data rate. The data aggregation unit is configurable to operate in a first mode for aggregating the first symbol and the second symbol in multiple clock cycles of a clock signal. The data aggregation module also includes a data buffer coupled to the data aggregation unit and at least one of the inputs. The data buffer is configured to store the first symbol based on the clock signal if the selected mode is the first mode. Further, the data aggregation unit is configurable to operate in a second mode for aggregating the first symbol and the second symbol in a clock cycle of the clock signal. The data aggregation unit further configured to output both the first symbol and the second symbol in a clock cycle of the clock signal. The deskew buffer is configured to receive the first symbol and the second symbol from the data aggregation module in a clock cycle of the clock signal. Additionally, the deskew buffer is configured to deskew symbols received from the data aggregation module.

A method of aggregating symbols, in accordance with one embodiment, includes selecting a mode for aggregating symbols of a data stream based on a data rate of the data stream. The method also includes receiving a first symbol of the data stream at the data rate. The method further includes storing the first symbol based on a clock signal if the selected mode is a first mode. The method also includes receiving a second symbol of the data stream at the data rate. The second symbol follows the first symbol in the data stream. Additionally, the method also includes outputting both the first symbol and the second symbol in a clock cycle of the clock signal.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a transmitter of a communication system transmits data streams to a receiver in the communication system. A deskew module of the receiver includes deskew units, each of which includes a data aggregation module for receiving symbols of a corresponding data stream at a selectable data rate and a deskew buffer corresponding to the data aggregation module. The data aggregation module receives symbols of the corresponding data stream at the selected data rate. Additionally, the data aggregation module aggregates a number of the symbols in one or more clock cycles of a clock signal based on the data rate. Further, the data aggregation module outputs the aggregated symbols to the corresponding deskew buffer in a clock cycle of a clock signal. The deskew buffer receives the aggregated symbols from the data aggregation module in the clock cycle and deskews symbols received from the data aggregation module. In this way, the deskew module aligns symbols across the data streams. Further, the receiver generates an output data stream based on the aligned symbols.

Because the deskew buffers receive the same number of symbols from the data aggregation module in a clock cycle of the clock signal regardless of the data rate of the data aggregation module, the number and complexity of wire interconnects in the deskew are reduced. Further, the size and complexity of logic circuits in the deskew module are reduced. As a result, a design cycle for designing the deskew module is reduced and timing issues are avoided late in the design cycle. Moreover, size and power consumption of the deskew module are reduced in embodiments in which the deskew module is implemented in an integrated circuit.

Figure 1:
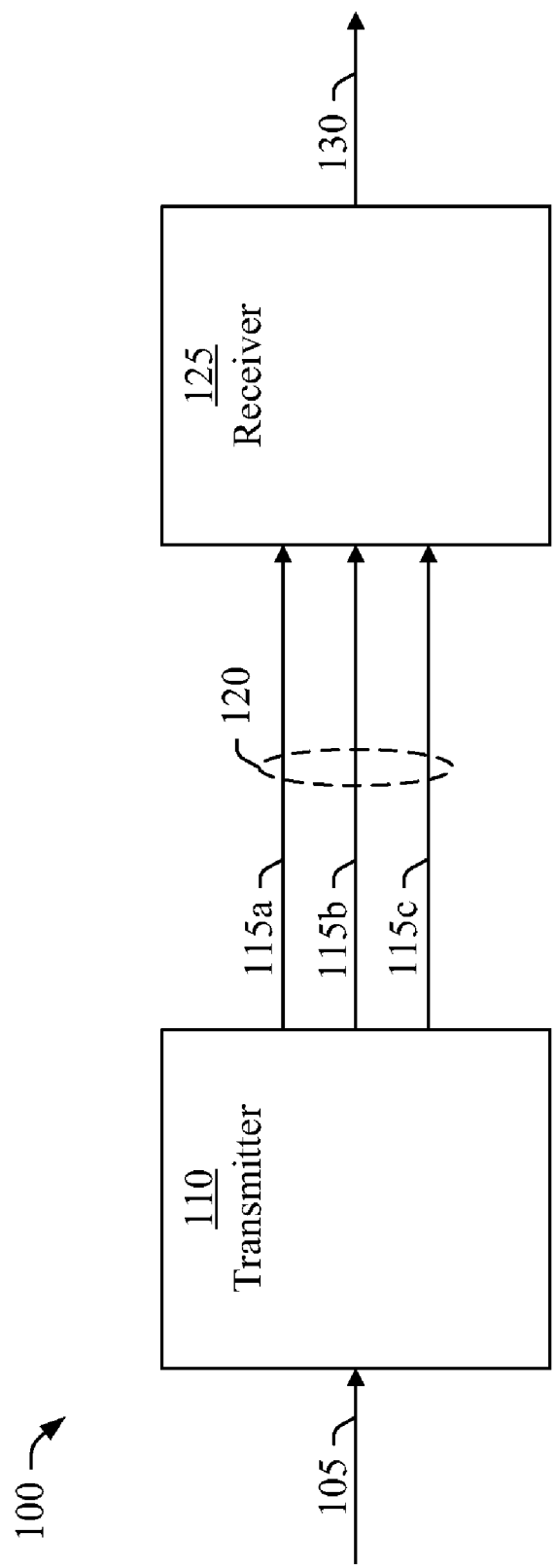
FIG. 1 is a block diagram of a communication system, in accordance with an embodiment of the present invention.

FIG. 1 illustrates a communication system 100, in accordance with an embodiment of the present invention. The communication system 100 includes a transmitter 110 and a receiver 125. The transmitter 110 is coupled (e.g., connected) to the receiver 125 via multiple data lanes 120. The transmitter 110 receives a data stream 105 (e.g., a sequence of symbols), converts (e.g., serializes) the data stream 105 into multiple data streams 115 (e.g., serial data streams), and transmits the multiple data streams 115 via corresponding data lanes 120 to the receiver 125. The receiver 125 converts the data streams 115 received from the transmitter 110 through the data lanes 120 into symbols (e.g., deserializes the data streams 115), generates a data stream 130 representing the data stream 105 (e.g., the original data stream), and outputs the data stream 130. In this way, the receiver 125 reconstructs the data stream 105 from the data streams 115 received through the data lanes 120. In various embodiments, the data lanes 120 are wired communication links or wireless communication links. Although three data lanes 120 are illustrated in FIG. 1, the communication system 100 may have more or fewer than three data lanes 120 in other embodiments.

In various embodiments, the transmitter 110 transmits the data streams 115 through the data lanes 120 by distributing data symbols of the data stream 105 among the data streams 115. Because the data lanes 120 may have different electrical properties, the data rates of the data streams 115 received by the receiver 125 through the data lanes 120 may vary. For example, the propagation delays of the data streams 115 may vary because of different physical characteristics of the data lanes 120, such as lengths and impedances of the data lanes 120. The receiver 125 aligns the data symbols of the data streams 115 by compensating for the different data rates of the data streams 115 and generates the data stream 130 based on the aligned data symbols. In this way, the data stream 130 includes the same data symbols as the data stream 105 (e.g., the original data stream).

In some embodiments, the data lanes 120 are part of a serial data link. For example, the serial link may be a PCI-Express™ bus or a wireless communication link. In these embodiments, the transmitter 110 generates the data streams 115 by converting (e.g., serializing) symbols of the data stream 105 and transmits the data streams 115 serially through the data lanes 120 to the receiver 125. In turn, the receiver 125 converts (e.g., deserializes) the data streams 115 into symbols and aligns the symbols. In some embodiments, the transmitter 110 encodes the symbols in the data streams 105 before transmitting the data streams 115 to the receiver 125. For example, the transmitter 110 may encode the symbols in the data stream 105 and generate the data streams 115 by using the encoded symbols. In these embodiments, the receiver 125 decodes the symbols in the data streams 115 received from the transmitter 110. For example, the transmitter 110 may generate the data streams 115 by encoding the symbols in the data stream 105 and serializing the encoded symbols, and the receiver 125 may deserialize the encoded symbols in the data streams 115 and decode the encoded symbols.

In various embodiments, each of the data symbols in the data stream 105 includes eight data bits and the transmitter 110 encodes the data symbols into data symbols having ten bits by using an 8b/10b transmission code. For example, the transmission code may be an 8b/10b transmission code specified in the ANSI X3.230-1994 standard, the IEEE 802z standard, or the IEEE 36.2.4 standard. In these embodiments, an 8-bit data symbol is divided into three data bits and five data bits that are mapped onto a four-bit code group and a six-bit code group, respectfully. Moreover, the four-bit group code and the six-bit group code together form a 10-bit data symbol in the 8b/10b transmission code. In addition to encoding the 8-bit data symbols into 10-bit data symbols, the 8b/10b transmission code is used to encode control symbols (e.g., special symbols) for controlling transmission of data. For example, the 8b/10b transmission code may include a skip symbol (SKP) and a comma symbol (COM).

In operation, the transmitter 110 periodically inserts a skip ordered set (SKPOS) into each data stream 115 transmitted through the data lanes 120 to the receiver 125. Each skip order set includes one or more control symbols. For example, a skip ordered set may include a comma symbol followed by one or more skip symbols. The receiver 125 aligns the data streams 115 based on the skip ordered sets to compensate for differences in data rates of the data streams 115 received by the receiver 125 as well as frequency differences between a clock signal in the transmitter 110 and a clock signal in the receiver 125. In this process, the receiver 125 selectively deletes and inserts control symbols (e.g., skip symbols) in the skip ordered sets of the data streams 115 to compensate for the different data rates of the data streams 115 received by the receiver 125 and the frequency differences between the clock signals in the transmitter 110 and the receiver 125.

For example, the receiver 125 may delete one or more control symbols (e.g., skip symbols) from a data stream 115 having a faster data rate and insert one or more control symbols (e.g., skip symbols) into a data stream 115 having a slower data rate. In this way, the receiver 125 compensates for differences in the data rates of the data streams 115 received by the receiver 125. As another example, the receiver 125 may delete control symbols from data streams 115 if the clock signal in the transmitter 110 has a higher frequency than the clock signal in the receiver 125 or add control symbols to data streams 115 when the clock signal in the transmitter 110 has a lower frequency than the clock signal in the receiver 125. In this way, the receiver 125 compensates for differences between the frequencies of the clock signal in the transmitter 110 and the clock signal in the receiver 125.

In various embodiments, a skip ordered set includes a comma symbol followed by three skip symbols. In these embodiments, the receiver 125 may delete one or two control symbols (e.g., skip symbols) or insert one or two control symbols (e.g., skip symbols) in one or more of the skip ordered sets to compensate for different data rates of the data streams 115 or frequency differences between the clock signals in the transmitter 110 and the receiver 125. For example, the receiver 125 may insert up to two skip symbols or delete up to two skip symbols in a skip ordered set to compensate for the different data rates of the data stream 115 received by the receiver 125. In this example, a skip ordered set contains a comma symbol followed by a number of skip symbols in the range of one to five.

Additionally, the receiver 125 aligns the data symbols in the data stream 115 based on the skip ordered sets. In some embodiments, the receiver 125 generates minimal skip ordered sets by selectively deleting one or more symbols in the skip ordered sets of the data streams 115. Each of the minimal skip ordered sets includes a same predetermined number of symbols (e.g., control symbols). In this way, storage requirements in the receiver 125 for storing control symbols of skip ordered sets for aligning data symbols in data streams 115 is reduced. Further, the receiver 125 generates the data stream 130 by selectively adding control symbols to the minimal skip ordered sets, as is described more fully herein. Although the receiver 125 deletes one or more symbols in the skip ordered sets of the data streams 115, the receiver 125 need not delete a symbol from each of those skip ordered sets to generate the minimal skip ordered sets. For example, a skip ordered set in a data stream 115 may have the same number of symbols as the minimal skip ordered set generated from the skip ordered set in the data stream 115, namely the predetermined number of control symbols. Thus, the receiver 125 need not delete a symbol from the skip ordered set in a data stream 115 to generate the minimal skip ordered set.

In embodiments in which the receiver 125 generates minimal skip ordered sets, control circuitry in the receiver 125 for aligning the data symbols in the data streams 115 may determine a priori a clock cycle of a clock signal in the receiver 125 is which data symbols of the data streams 115 will be aligned in the receiver 125. As a result, the control circuitry has multiple clock cycles of the clock signal to determine when the data symbols of the data streams 115 will be aligned in the receiver 125, which allows the control circuitry to operate as a higher frequency of the clock signal in the receiver 125.

Moreover, because the clock signal of the receiver 125 may operate at a higher frequency, the receiver 125 may receive the data streams 115 at a higher data rate and generate the data stream 130 at a higher data rate. As a result, the communication system 100 may operate at a higher communication rate.

Figure 2:
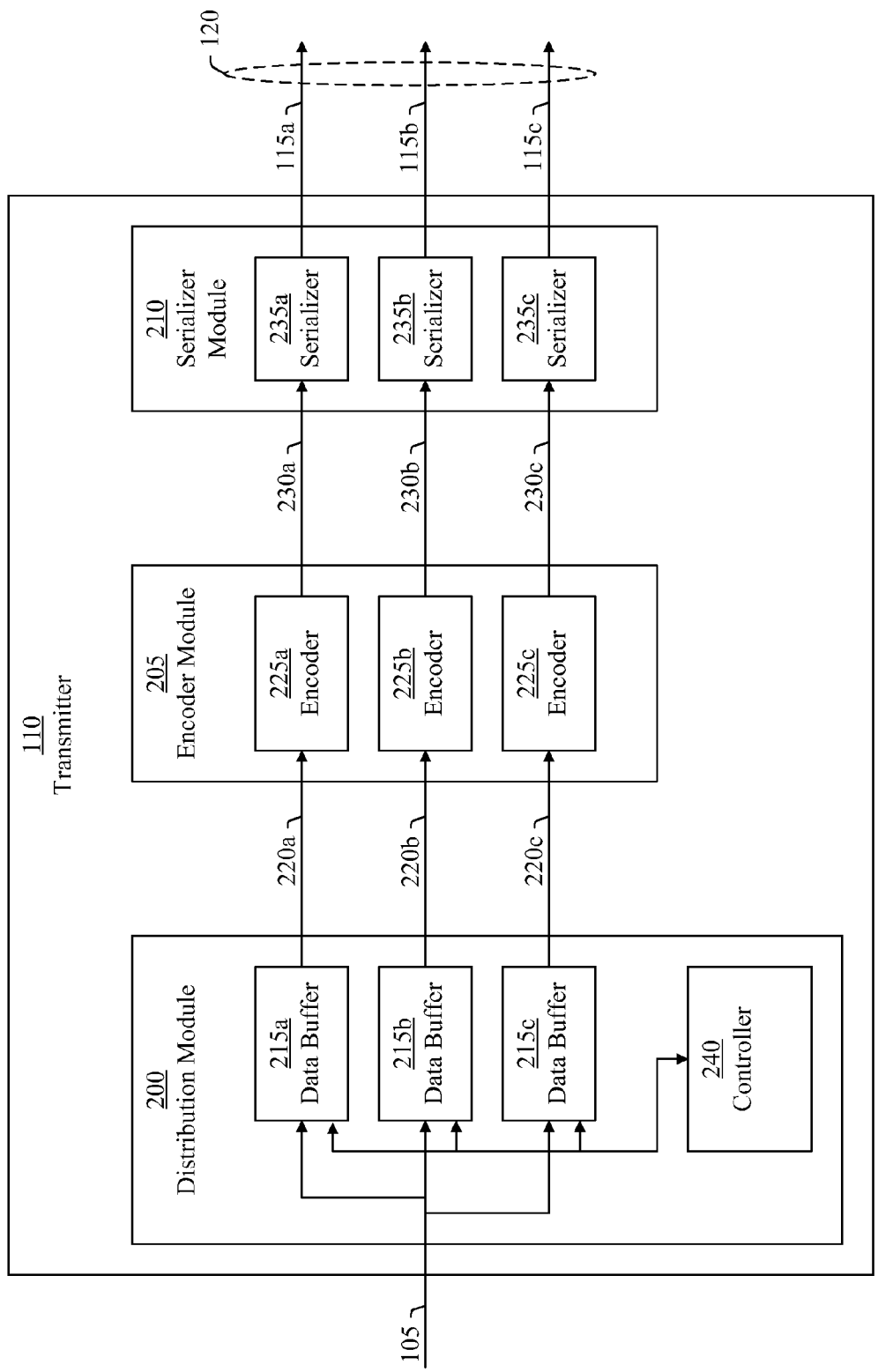
FIG. 2 is a block diagram of a transmitter, in accordance with an embodiment of the present invention.

FIG. 2 illustrates the transmitter 110, in accordance with an embodiment of the present invention. The transmitter 110 includes a distribution module 200, an encoder module 205, and a serializer module 210. The encoder module 205 is coupled to the distribution module 200 and the serializer module 210. The distribution module 200 generates data streams 220 (e.g., data streams 220a-c) by distributing data symbols in the data stream 105 among the data streams 220. For example, the distribution module 200 may stripe data symbols in the data stream 105 among the data streams 220. The encoder module 205 generates data streams 230 (e.g., data streams 230a-c) by encoding the symbols in the data streams 220. The serializer module 210 generates the data streams 115 (e.g., the data streams 115a-c) by serializing the symbols in the data streams 230.

Although the transmitter 110 has been described herein as generating the data streams 220 based on the data stream 105, the data streams 230 based on the data streams 220, and the data streams 115 based on the data streams 230, in various embodiments some or all of the data stream 105, the data streams 220, the data streams 230, and the data streams 115 are considered to be part of the same data stream. In these embodiments, components of the transmitter 110 perform operations or functions on the same data stream. For example, the distribution module 200 may distribute symbols in the data stream 105 among the data streams 220, the encoder module 205 may encode symbols in the data stream 105, and the serializer module 210 may generate the data streams 115 by serializing the encoded data symbols in the data stream 105.

In one embodiment, the distribution module 200 includes data buffers 215 (e.g., data buffers 215a-c) and a controller 240 coupled (e.g., connected) to each of the data buffers 215. The controller 240 controls operation of the distribution module 200. In some embodiments, the controller 240 also controls operation of the encoder module 205 or the serializer module 210, or both. Further, the encoder module 205 includes encoders 225 (e.g., encoders 225a-c) and the serializer module 210 includes serializers 235 (e.g., serializers 235a-c). Each of the encoders 225 is coupled (e.g., connected) to a corresponding data buffer 215 and a corresponding serializer 235. As illustrated in FIG. 2, the encoders 225a-c are coupled to corresponding data buffers 215a-c and corresponding serializers 235a-c. In other embodiments, the distribution module 200 may have more or fewer than three data buffers 215, the encoder module 205 may have more or fewer than three encoders 225, and the serializer module 210 may have more or fewer than three serializers 235.

In operation, the data buffers 215 receive the data stream 105 and the controller 240 distributes data symbols in the data stream 105 among the data buffers 215 by selectively writing the data symbols into the data buffers 215. For example, the controller 240 may stripe the data symbols in the data stream 105 among the data buffers 215. Each of the data buffers 215 generates a data stream 220, which includes the data symbols of the data stream 105 written into the data buffer 215, and provides the data stream 220 to the encoder 225 corresponding to the data buffer 215.

Each of the encoders 225 encodes the symbols in the data stream 220 received from the data buffer 215 corresponding to the encoder 225. In one embodiment, each of the symbols in the data stream 220 is an 8-bit data symbol and each encoder 225 encodes the data symbols in the data stream 220 received from data buffer 215 corresponding to the encoder 225 into 10-bit data symbols. Additionally, the encoder 225 generates a data stream 230, which includes the 10-bit data symbols encoded by the encoder 225, and provides the data stream 230 to the serializer 235 corresponding to the encoder 225. Periodically, the controller 240 simultaneously inserts a skipped order set into each of the data streams 220. For example, the controller 240 my write the skip ordered sets into the data buffers 215. As another example, the controller 240 may write the skip ordered sets into the encoders 225. Each of the skipped ordered sets includes one or more 10-bit control symbols. In various embodiments, each of the skipped ordered sets includes a 10-bit comma symbol followed by three 10-bit skip symbols.

Each of the serializers 235 generates a data stream 115 by serializing the data symbols and the control symbols in the data stream 230 received from the corresponding encoder 225. Further, the serializer module 210 transmits each of the data streams 115 to the receiver 125 through the data lane 120 corresponding to the data stream 115. In some embodiments, the serializer module 210 is optional. In embodiments without the serializer module 210, the transmitter 110 transmits parallel data (e.g., data symbols and control symbols) to the receiver 125 through each of the data lanes 120.

Figure 3:
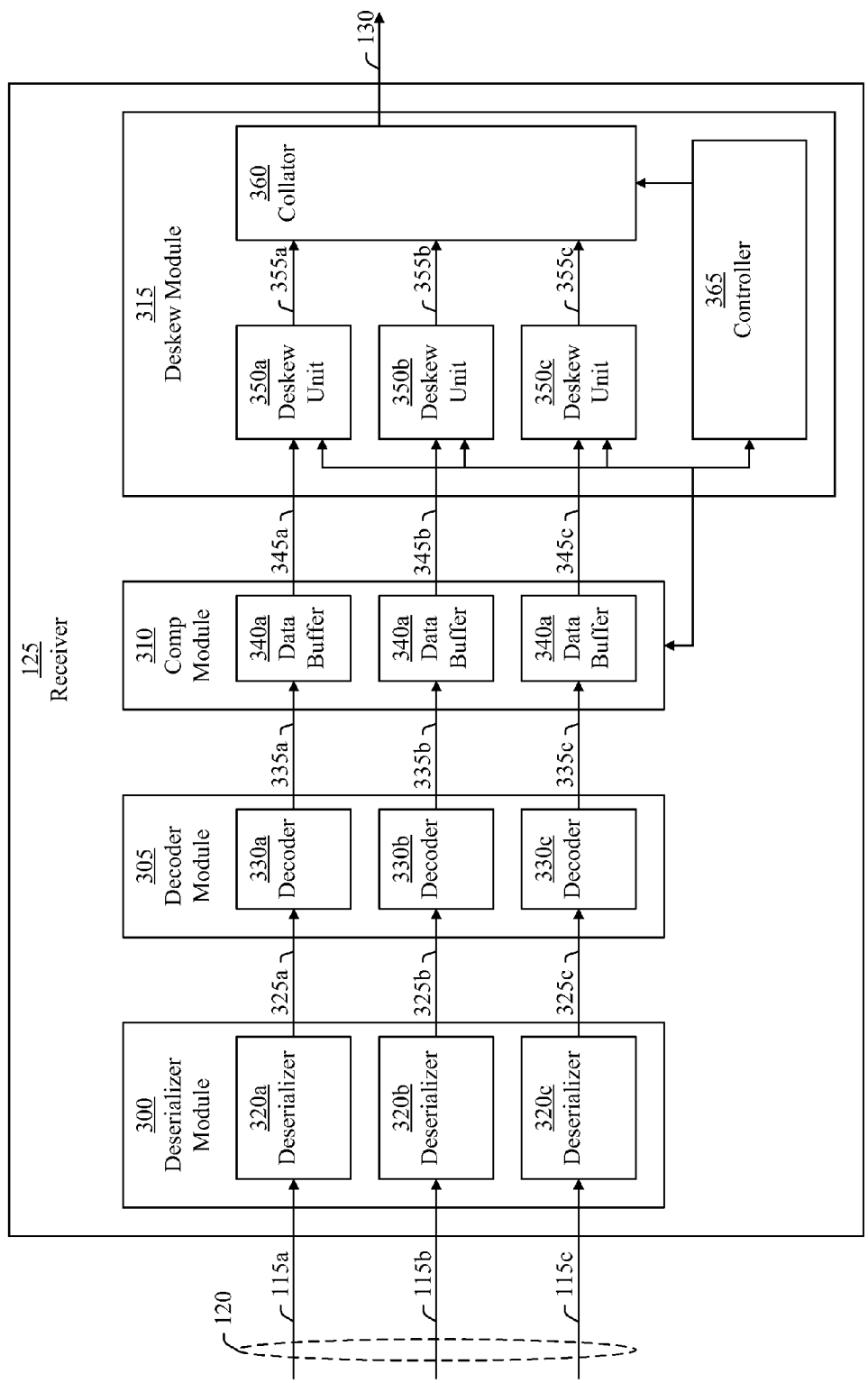
FIG. 3 is a block diagram of a receiver, in accordance with an embodiment of the present invention.

FIG. 3 illustrates the receiver 125, in accordance with an embodiment of the present invention. The receiver 125 includes a deserializer module 300, a decoder module 305, a compensation module (Comp Module) 310, and a deskew module 315. The decoder module 305 is coupled (e.g., connected) to the deserializer module 300 and the compensation module 310. Additionally, the compensation module 310 is coupled (e.g., connected) to the deskew module 315. The deserializer module 300 receives the data streams 115 from the transmitter 110 through the data lanes 120 and generates data streams 325 corresponding to the data streams 115 by deserializing symbols (e.g., data symbols and control symbols) in the data streams 115. In this process, the deserializer module 300 reconstructs a clock signal for each data stream 115 based on the symbols (e.g., serial symbols) in the data stream 115. Further, the deserializer module 300 generates the data streams 325 by converting the data streams 115 (e.g., serial data streams) into symbols based on the reconstructed clock signals. The symbols in each data stream 325 represent the encoded data symbols of a corresponding data stream 115 as well as encoded control symbols of skip ordered sets generated by the transmitter 110 and inserted into the data stream 115. For example, each data stream 325 may be a sequence of symbols including encoded data symbols and encoded control symbols.

The decoder module 305 receives the data streams 325 from the deserializer module 300 and generates data streams 335 corresponding to the data streams 325 by decoding symbols in the data streams 325. For example, each of the data streams 335 may be a sequence of symbols including decoded data symbols and decoded control symbols. In various embodiments, each of the symbols in the data streams 325 includes ten data bits and the decoder module 305 decodes the symbols in the data stream 325 into symbols having eight bits by using an 8b/10b transmission code. For example, the transmission code may be an 8b/10b transmission code specified in the ANSI X3.230-1994 standard, the IEEE 802z standard, or the IEEE 36.2.4 standard. In these embodiments, each of the data streams 335 includes data symbols having eight-bits and control symbols having eight bits. Moreover, each of the data streams 335 includes skip ordered sets including control symbols. For example, each of the data streams 335 may include a skip ordered set including a comma symbol followed by three skip symbols. The decoder module 305 provides the data streams 335 to the compensation module 310.

The compensation module 310 generates data streams 345 by selectively adding control symbols (e.g., skip symbols) to skip ordered sets in the data streams 335 and selectively deleting control symbols from skip ordered sets in the data streams 335. In this way, the compensation module 310 selectively modifies the number of control symbols in the skip ordered sets of the data streams 345 to compensate for the different data rates at which the receiver 125 receives the data streams 115 as well as frequency differences between the clock signals of the transmitter 110 and the receiver 125. Moreover, the compensation module 310 inhibits data underflow and data overflow from occurring in the receiver 125 because of the different data rates of the data streams 115 received by the receiver 125. For example, the compensation module 310 may add a skip symbol to a skip ordered set of a data stream 335 in which the corresponding data stream 115 has a slower data rate and delete a skip symbol from a skip ordered set of a data stream 335 in which the corresponding data stream 115 has a faster data rate. The compensation module 310 provides the data streams 345 to the deskew module 315. Because the compensation module 310 generates the data streams 345 by individually adding symbols to skip ordered sets in the data streams 335 and individually deleting symbols from the skip ordered sets in the data streams 335, the data symbols in the data streams 345 may not be aligned with each other.

In some embodiments, the compensation module 310 deletes each symbol from a skip ordered set of a data stream 335 and adds another symbol to the corresponding data stream 345. In these embodiments, the symbol added to the data stream 345 is a minimal skip ordered set that includes the symbol. In other embodiments, the compensation module 310 deletes each symbol from the skip ordered sets in the data streams 335 and adds minimal skip ordered sets to the data streams 345 by adding symbols to the data streams 345. In these embodiments, each of the skip ordered sets in the data streams 345 has the same number of symbols.

In some embodiments, the compensation module 310 deletes each symbol from a skip ordered set of a data stream 335 and generates a tag in the corresponding data stream 345 for indicating a location of a minimal skip ordered set. Further, the compensation module 310 associates the tag with a data symbol in the data stream 345. In turn, the deskew module 315 stores the tag along with the data symbol.

In one embodiment, a tag is a binary value and each location in the data buffer 340 includes a bit for storing a tag along with a data symbol. For example, a tag having a binary value of one stored at a location of the deskew module 315 may indicate a minimal skip ordered set associated with a data symbol stored at that location. Conversely, a tag having a binary value of zero stored at a location of the deskew module 315 may indicate a skip ordered set is not associated with a data symbol stored at that location.

In various embodiments, a minimal skip ordered set includes the tag indicating the location of the minimal skip ordered set. In this way, the symbols of a skip ordered set in a data stream 335 are replaced with a corresponding minimal skip ordered set containing a tag in the corresponding data stream 345. In one embodiment, a tag associated with a data symbol in a data stream 345 indicates that the location of a minimal skip ordered set containing the tag follows the data symbol. In another embodiment, a tag associated with a data symbol in a data stream 345 indicates that the location of a minimal skip ordered set containing the tag precedes the data symbol.

In various embodiment, the compensation module 310 receives each of the data streams 335 based on the reconstructed clock signal of the data stream 335 and provides the data streams 345 to the deskew module 315 based on the clock signal in the receiver 125. In this way, the compensation module 310 synchronizes the reconstructed clock signals with the clock signal in the receiver 125 and synchronizes the data streams 335 with the data streams 345. Moreover, the compensation module 310 modifies the skip ordered sets in the data streams 335 based on the reconstructed clock signals corresponding to the data streams 335. Because the reconstructed clock signals may operate at slightly different frequencies from each other and from the clock signal in the receiver 125, the data symbols of the data streams 345 may be misaligned from each other. The data symbols of the data streams 345 may be further misaligned from each other because of different propagation delays among the data streams 115, different propagation delays among the data streams 325, or different propagation delays among the data streams 335. For example, propagation delays may vary among the data streams 115 because signal traces used transmit the data streams 115 in the receiver 125 have different lengths or impedances.

The deskew module 315 generates the data streams 355 based on the data streams 345. In this process, the deskew module 315 stores data symbols of the data streams 345 as well as symbols of skip ordered sets in the data streams 345. Additionally, the deskew module 315 aligns the data symbols stored in the deskew module 315 based on the skip ordered sets stored in the deskew module 315. In some embodiments, the deskew module 315 generates and stores minimal skip ordered sets by selectively deleting control symbols from the skip ordered sets in the data streams 345 such that each minimal skip ordered set stored in the deskew module 315 has the same number of control symbols. For example, each of the minimal skip ordered sets stored in the deskew module 315 may consist of a single comma symbol followed by a single skip symbol. Because the number of control symbols in the minimal skip ordered sets stored in the deskew module 315 is less than a maximum specified number of control symbols in the skip ordered sets of the data streams 345, the required size and storage capacity of the deskew module 315 is reduced. Furthermore, because each of the minimal skip ordered sets has the same number of control symbols, control circuitry in the deskew module 315 may have multiple clock cycles of the clock signal in the receiver 125 for aligning data symbols based on the minimal skip ordered sets stored in the deskew module 315, as is described more fully herein.

In one embodiment, the deskew module 315 outputs multiple symbols of each data stream 355 in a single clock cycle. For example, the deskew module 315 may output two symbols of each data stream 355 on an edge of the clock signal in the receiver 125. In this way, the receiver 125 may operate at a higher communication rate by receiving the data streams 115 from the data lanes 120 at a higher data rate (e.g., twice the data rate).

In various embodiments, the receiver 125 includes a physical media access sublayer (PMA), a physical coding sublayer (PCSi), and a media access control (MAC). In this embodiment, the physical media access layer includes the deserializer module 300, the physical coding sublayer includes the decoder module 305 and the compensation module 310, and the media access control includes the deskew module 315.

In various embodiments, the deserializer module 300 includes deserializers 320 (e.g., deserializers 320a-c), the decoder module 305 includes decoders 330 (e.g., decoders 330a-c), the compensation module 310 includes data buffers 340 (e.g., data buffers 340a-c). Each of the decoders 330 corresponds to a deserializer 320 and to a data buffer 340. In these embodiments, each deserializer 320 receives a corresponding data stream 115 from the transmitter 110 through a corresponding data lane 120 and generates a corresponding data stream 325 by deserializing symbols in the data stream 115. In this process, the deserializer module 300 reconstructs a clock signal for each data stream 115 based on the symbols in the data stream 115. Further, each deserializer 320 generates a data stream 325 by converting the data stream 115 (e.g., serial data) received by the deserializer 320 into symbols (e.g., parallel data) based on the reconstructed clock signal of the data stream 115. The symbols in each of the data streams 325 include encoded data symbols of the data stream 115 as well as encoded control symbols of skip ordered sets in the data stream 115. For example, each of the data streams 325 may be a sequence of symbols including encoded data symbols and encoded control symbols.

Each of the decoders 330 receives a data stream 325 from the deserializer 320 corresponding to the decoder 330 and generates a data stream 335 corresponding to the data stream 325 by decoding the symbols (e.g., encoded data symbols and encoded control symbols) in the data stream 325. In various embodiments, the symbols in the data streams 325 are 10-bit data symbols and the symbols in the data streams 335 are 8-bit symbols. In some embodiments, each of the symbols in the data steams 335 further includes a data bit indicating whether symbol is a data symbol or a control symbol. For example, each symbol in the data stream 335 may include least nine bits, which includes the eight data bits representing the symbols and a data bit indicating whether the symbol is a data symbol or a control symbol. In some embodiments, each of the symbols in the data stream 335 includes a data bit indicating whether the symbol is valid (e.g., contains valid data). For example, each symbol in the data stream 335 may include nine bits, which includes eight data bits representing the symbol and a data bit indicating whether the symbol is valid.

In some embodiments, each of the symbols in the data stream 335 includes a data bit indicating whether the symbol is a data symbol or a control symbol and a data bit indicating whether the symbol is valid. For example, each symbol in the data stream 335 may include least ten bits, which includes the eight data bits representing the symbols, a data bit indicating whether the symbol is a data symbol or a control symbol, and a data bit indicating whether the symbol is valid. In some embodiments, each of the symbols in the data stream 335 includes a bit indicating whether a minimal skip ordered set is associated with the symbol, as is described more fully herein.

Each of the data buffers 340 in the compensation module 310 receives a data stream 335 from the decoder 330 corresponding to the data buffer 340. In turn, the compensation module 310 generates the data streams 345 corresponding to the data streams 335 by selectively modifying the number of symbols (e.g., control symbols) in skip ordered sets of the data streams 335. Further, the compensation module 310 stores the data symbols of each data stream 335 and the resulting skip ordered set of the data stream 335 into the data buffer 340 (e.g., a compensation buffer) corresponding to the data stream 335. In this way, the compensation module 310 prevents data underflow and data overflow from occurring in the data buffers 340. In various embodiments, the compensation module 310 selectively modifies the number of symbols in a skip ordered set of the data stream 335 by selectively adding one or more symbols (e.g., control symbols) to the skip ordered set or selectively deleting one or more symbols from the skip ordered set.

By selectively modifying the number of symbols in the skip ordered sets of the data stream 335 to prevent data underflow or data underflow from occurring in the data buffers 340, the compensation module 310 compensates for the different data rates of the data streams 115 received by the receiver 125. For example, the compensation module 310 may add a skip symbol to a skip ordered set of a data stream 335 having a slower data rate and delete a skip symbol from a skip ordered set of a data stream 335 having a faster data rate. Because the compensation module 310 generates the data streams 345 by individually adding symbols to, or deleting symbols from, skip ordered sets in the data streams 335, the data symbols in the data streams 345 may not be aligned with each other.

In various embodiments, the deskew module 315 includes deskew units 350 (e.g., deskew units 350a-c), a collator 360, and a controller 365. The deskew units 350 are coupled (e.g., connected) to the collator 360 and the controller 365. Additionally, the collator 360 is coupled (e.g., connected) to the controller 365. Each of the deskew units 350 corresponds to a data buffer 340 in the compensation module 310 and receives a data stream 345 from the corresponding data buffer 340. The controller 365 writes (e.g., stores) the data symbols of the data stream 345 and symbols of skip ordered sets generated from the data stream 345 into the deskew unit 350 (e.g., a deskew buffer) corresponding to the data stream 345. In some embodiments, the controller 365 identifies a skip ordered set in a data stream 345, generates a minimal skip ordered set based on the skip ordered set in the data stream 345, and writes the minimal skip ordered set into the deskew unit 350. The minimal skip ordered set includes a predetermined number of symbols, which may include one or more control symbols in the identified skip ordered set. In other embodiments, the controller 365 identifies skip ordered sets in the data streams 345, generates skip ordered sets based on the skip ordered sets in the data stream 345, and writes the skip ordered set into the deskew unit 350. In these embodiments, each of the minimal skip ordered sets generated by the controller 365 has a same number of symbols. For example, a minimal skip ordered set may be a tag indicating a location of the minimal skip ordered set. In this example, the minimal skip ordered set contains no symbols (e.g., zero symbols).

In various embodiments, the controller 365 generates a minimal skip ordered set based on an identified skip ordered set by selectively deleting one or more control symbols from the identified skip ordered set. Moreover, each of the minimal skip ordered sets has a same predetermined number of control symbols. In some cases, the minimal skip ordered set is the same as the identified skip ordered set. In these cases, the identified skip ordered set has the same number of symbols as the predetermined number of symbols in the minimal skip ordered set. By storing the minimal skip ordered sets instead of the skip ordered sets identified in the data streams 345, the size and storage capacity requirements of the deskew units 350 are reduced, which also decreases power consumption in the deskew module 315.

In various embodiments, a minimal skip ordered set is a sequence of two symbols (e.g., two control symbols). For example, a minimal skip ordered set may be a comma symbol followed by a skip symbol. In some embodiments, the controller 365 writes a minimal skip ordered set into a deskew unit 350 by writing the first two symbols of an identified skip ordered set into the deskew unit 350 and discarding any remaining symbols of the identified skip ordered set. In other embodiments, the controller 365 generates the minimal skip ordered set, writes (e.g., stores) the minimal skip ordered set into the deskew unit 350, and discards the identified skip ordered set.

In various embodiments, a minimal skip ordered set is single symbol (e.g., a single control symbol). For example, a minimal skip ordered set may be a comma symbol. In some embodiments, the controller 365 writes a minimal skip ordered set into a deskew unit 350 by writing the first symbol of an identified skip ordered set into the deskew unit 350 and discarding any remaining symbols of the identified skip ordered set. In other embodiments, the controller 365 generates the minimal skip ordered set, writes (e.g., stores) the minimal skip ordered set into the deskew unit 350, and discards the identified skip ordered set.

Figure 4:
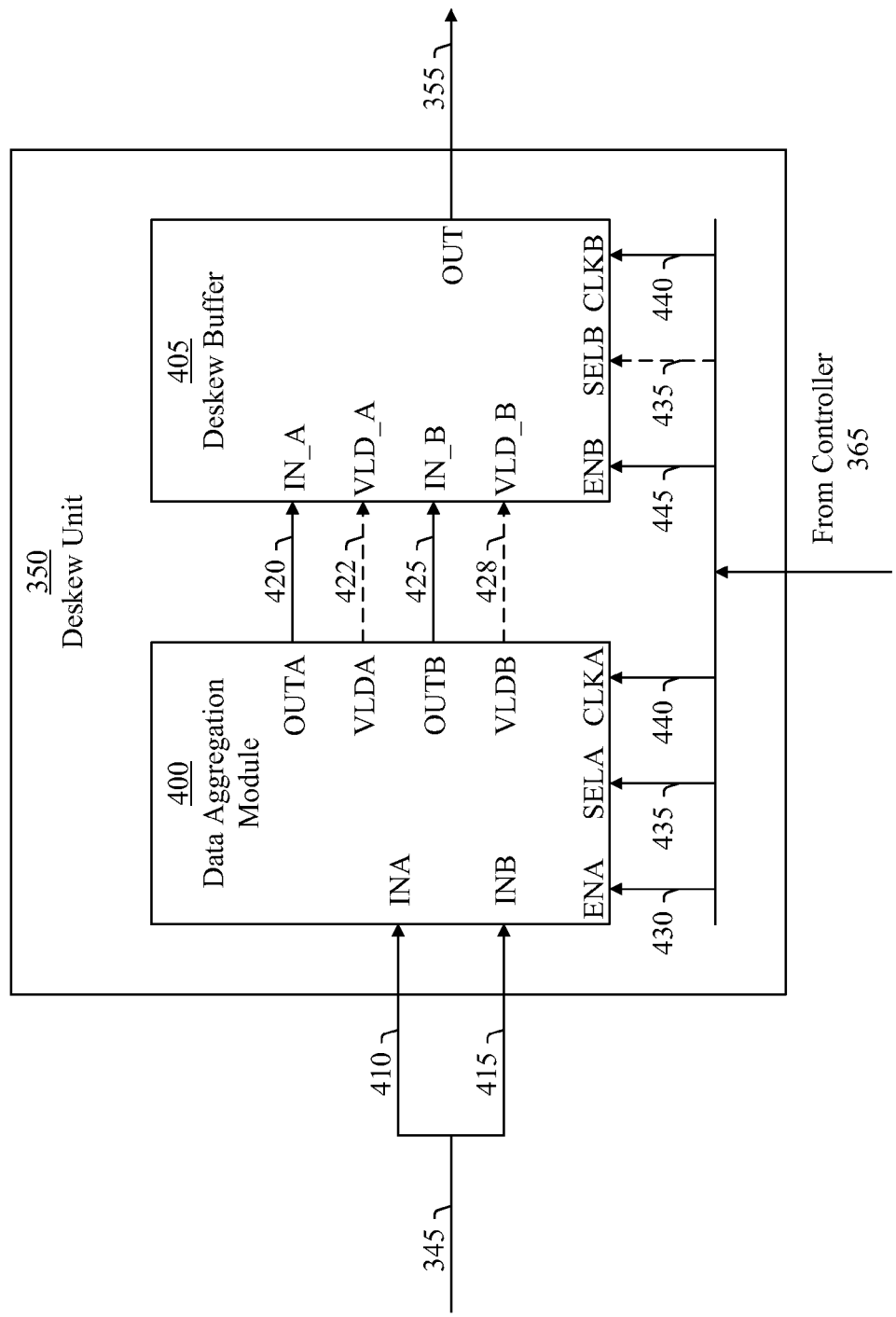
FIG. 4 is a block diagram of a deskew unit, in accordance with an embodiment of the present invention.

FIG. 4 illustrates the deskew unit 350, in accordance with an embodiment of the present invention. The deskew unit 350 includes a data aggregation module 400 and a deskew buffer 405 coupled (e.g., connected) to the data aggregation module 400. The data aggregation module 400 includes inputs INA, INB, ENA, SELA, and CLKA. Additionally, the data aggregation module 400 includes outputs OUTA and OUTB. The deskew buffer 405 includes inputs IN_A, IN_B, ENB, and CLKB. Additionally, the deskew buffer 405 includes an output OUT. In some embodiments, the deskew buffer 405 also includes an optional input SELB.

The data aggregation module 400 of the deskew unit 350 receives symbols of the data stream 345 corresponding to the data aggregation module 400 from the corresponding data buffer 340 of the compensation module 310 through data lanes 410 and 415. For example, the data buffer 340 may be a data queue including data storage locations identified by position relative to a head of the data buffer 340 and each of the data lanes 410 and 415 may be data bus. The data buffer 340 provides symbols from the head of the data buffer 340 to the input INA of the data aggregation module 400 through the data lane 410. Additionally, the data buffer 340 provides symbols at the data storage location immediately following the head of the data buffer 340 to the input INB of the data aggregation module 400 through the data lane 415. In this way, the data buffer 340 provides symbols of the data stream 345 to the data aggregation module 400.

Further, the data aggregation module 400 receives an enable signal 430 at the input ENA, a select signal 435 at the input SELA, and a clock signal 440 at the input CLKA. The select signal 435 indicates an input data rate for receiving symbols of the corresponding data stream 345 at the inputs INA and INB of the data aggregation module 400. The input data rate of the data aggregation module 400 indicates a number of unique symbols (e.g., additional symbols) received by the data aggregation module 400 in a clock cycle of the clock signal 440. For example, the input data rate of the data aggregation module 400 may be one-symbol per clock cycle of the clock signal 440 or two-symbols per clock cycle of the clock signal 440.

In operation, the data aggregation module 400 selects a mode of operation based on the select signal 435. In this way, the data aggregation module 400 selects the mode of operation based on the input data rate of the data aggregation module 400. The data aggregation module 400 aggregates symbols based on the enable signal 430 and the clock signal 440 according to the selected mode. Additionally, the data aggregation module 400 outputs the aggregated symbols from the outputs OUTA and OUTB in a clock cycle of the clock signal 440.

In one embodiment, the data aggregation module 400 is configurable to operate in a one-cycle mode of operation or a two-cycle mode of operation. In this embodiment, the data aggregation module 400 selects either the one-cycle mode or the two-cycle mode based on the select signal 435. If the input data rate of the data aggregation module 400 is two symbols per clock cycle of the clock signal 440, the data aggregation module 400 selects the one-cycle mode. Otherwise, if the input data rate of the data aggregation module 400 is one symbol per clock cycle of the clock signal 440, the data aggregation module 400 selects the two-cycle mode.

In the one-cycle mode, the data aggregation module 400 receives a first symbol at the input INA from the head of the corresponding data buffer 340 and a second symbol at the input INB from the data storage location of the data buffer 340 immediately following the head of the data buffer 340. Further, the data aggregation module 400 aggregates the first symbol and the second symbol in the clock cycle, outputs the first symbol from the output OUTA in the clock cycle, and outputs the second symbol from the output OUTB in the clock cycle. In this way, the data aggregation module 400 aggregates the first symbol and the second symbol in the clock cycle and outputs the aggregated symbols in the clock cycle.

In the two-cycle mode, the data aggregation module 400 receives the first symbol at the input INA from the head of the corresponding data buffer 340 in a first clock cycle of the clock signal 440. Additionally, the data aggregation module 400 receives the second symbol at the input INA from the head of the corresponding data buffer 340 in a second clock cycle of the clock signal 440 following the first clock cycle. Further, the data aggregation module 400 aggregates the first symbol and the second symbol in these clock cycles (e.g., the first clock cycle and the second clock cycle), outputs the first symbol from the output OUTA in the second clock cycle, and outputs the second symbol from the output OUTB in the second clock cycle. In this way, the data aggregation module 400 aggregates the first symbol and the second symbol in the two clock cycles and outputs the aggregated symbols in the second clock cycle.

In both the one-cycle mode and the two-cycle mode, the deskew buffer 405 receives the first symbol at the input IN_A through a data lane 420 and the second symbol at the input IN_B through the data lane 425 in a clock cycle of the clock signal 440. In this way, the deskew buffer 405 receives two symbols from the data aggregation module 400 in the clock cycle. In the one-cycle mode, the deskew buffer 405 receives two symbols in each clock cycle of the clock signal 440. In the two-cycle mode, the deskew buffer 405 receives two symbols in alternate clock cycles of the clock signal 440. In either mode, the input data rate of the deskew buffer 405 is the same as the input data rate of the data aggregation module 400.

Additionally, the deskew buffer 405 receives an enable signal 445 at the input ENB and the clock signal 440 at the input CLKB. The deskew buffer 405 stores symbols received from the data aggregation module 400 based on the enable signal 445 and the clock signal 440. Further, the deskew buffer 405 outputs symbols from the output OUT based on the clock signal 440. In some embodiments, the deskew buffer 405 outputs symbols from the output OUT based on both the enable signal 445 and the clock signal 440. In one embodiment, the deskew buffer 405 outputs two symbols from the output OUT in a clock cycle of the clock signal 440 based on the enable signal 445 when the data aggregation module 400 is operating in the one-cycle mode. Further in this embodiment, the deskew buffer 405 outputs two symbols from the output OUT in alternate clock cycles of the clock signal 440 based on the enable signal 445 when the data aggregation module 400 is operating in the two-cycle mode.

In some embodiments, the deskew buffer 405 receives the select signal 435 at the input SELB and outputs symbols from the output OUT based on the select signal 435 and the clock signal 440. In one embodiment, the deskew buffer 405 outputs two symbols from the output OUT in a clock cycle of the clock signal 440 based on the select signal 435 when the data aggregation module 400 is operating in the one-cycle mode. Further in this embodiment, the deskew buffer 405 outputs two symbols from the output OUT in alternate clock cycles of the clock signal 440 based on the select signal 435 when the data aggregation module 400 is operating in the two-cycle mode.

For example, the deskew buffer 405 may receive symbols from the data aggregation module 400 in a clock cycle (e.g., an even clock cycle) of the clock signal 440 in the two-cycle mode and output two symbols in the clock cycle but not output any symbols in the next clock cycle (e.g., an odd clock cycle). As another example, the deskew buffer 405 may receive symbols from the data aggregation module 400 in a clock cycle (e.g., an even clock cycle) of the clock signal 440 in the two-cycle mode and not output any symbols in the clock cycle. In this example, the deskew buffer 405 outputs two symbols in the next clock cycle (e.g., an odd clock cycle) of the clock signal 440.

In some embodiments, the controller 365 generates the enable signal 445 and the clock signal 440. In other embodiments, the controller 365 generates the select signal 435 and the clock signal 440, and the deskew buffer 405 receives the select signal 435 at an input of the deskew buffer 405 generates the enable signal 445 based on the select signal 435 and the clock signal 440.

In some embodiments, the deskew buffer 405 stores the first symbol and the second symbol in the same clock cycle of the clock signal 440 in which the data aggregation module 400 outputs the first symbol and the second symbol. In other embodiments, the deskew buffer 405 selectively stores the first symbol and the second symbol in the same clock cycle of the clock signal 440 in which the data aggregation module 400 outputs the first symbol and the second symbol. In these embodiments, the deskew buffer 405 may store either the first symbol or the second symbol, or neither the first symbol nor the second symbol, to generate a minimal skip ordered set in the deskew buffer 405, as is described more fully herein.

In various embodiments, each of the deskew units 350 generates the data stream 355 corresponding to the deskew unit 350 by deskewing symbols stored in the deskew buffer 405 of the deskew unit 350 and outputting symbols from the deskew buffer 405 into the corresponding data stream 355. In the one-cycle mode, the deskew buffer 405 deskews two symbols in a clock cycle of the clock signal 440 and the deskew unit 350 outputs two symbols from the deskew buffer 405 into the corresponding data stream 355 in the clock cycle. In the two-cycle mode, the deskew buffer 405 deskews two symbols in alternate clock cycles of the clock signal 440 and the deskew unit 350 outputs two symbols from the deskew buffer 405 into the corresponding data stream 355 in alternate clock cycles of the clock signal 440.

For example, in the two-cycle mode, the data aggregation module 400 may aggregate two symbols in two consecutive clock cycles (e.g., an even clock cycle followed by an odd clock cycle) of the clock signal 440. Further in this example, the deskew buffer 405 may deskew and output two symbols in the first clock cycle (e.g., the even clock cycle) of the two consecutive clock cycles. As another example, the data aggregation module 400 may aggregate two symbols in two consecutive clock cycles of the clock signal 440 and the deskew buffer 405 may deskew and output two symbols in the second clock cycle (e.g., the odd clock cycle) of the two consecutive clock cycles.

In various embodiments, the data aggregation module 400 receives one additional symbol from the corresponding data buffer 340 in a clock cycle of the clock signal 440 but each of the inputs INA and INB receives a symbol from the data buffer 340 in the clock cycle. In these embodiments, the data aggregation module 400 receives a first symbol at the input INA from the head of the data buffer 340 and receives a second symbol at the input INB from the data storage location following the head of the data buffer 340 in a same clock cycle of the clock signal 440. In the next clock cycle, the data buffer 340 deletes the first symbol from the head of the data buffer 340, advances the second symbol to the head of the data buffer 340, and stores a third symbol at the data storage location following the head of the data buffer 340. Further, the data aggregation module 400 receives the second symbol at the input INA from the head of the data buffer 340 and receives the third symbol at the input INB from the storage location following the head of the data buffer 340. Thus, the data aggregation module 400 receives two symbols in this clock cycle, which includes the second symbol and the third symbol, but receives only one additional symbol in the clock cycle. Because the data aggregation module 400 receives one additional symbol of the data stream 335 in each of the two consecutive clock cycles of the clock signal 440, the input data rate of the data aggregation module 400 is deemed to be one symbol per clock cycle.

In various embodiments, the controller 365 may generate the select signal 435 to indicate an input data rate for the data aggregation module 400 of one symbol per clock cycle of the clock signal 440 based on an input (e.g., a user input) to the receiver 125 indicating a Gen-1 SerDes data rate. Further, the controller 365 may generate the select signal 435 to indicate an input data rate for the data aggregation module 400 of two symbols per clock cycle of the clock signal 440 based on an input (e.g., a user input) indicating a Gen-2 SerDes data rate. In some embodiments, the receiver 125 determines the data rate of a data stream 115 received by the receiver 125 and the controller 365 generates the select signal 435 to indicate the data rate of the data stream 115. In this way, the controller 365 need not receive an input (e.g., a user input) to generate the select signal 435.

In various embodiments, the deskew module 315 selects the input data rate of the data aggregation modules 400 from among a number of predetermined data rates. In some embodiments, the deskew module 315 may select the input data rate of the data aggregation modules 400 to be more than two symbols per clock cycle of the clock signal 440. Further, the deskew module 315 may select the input data rate of the data aggregation modules 400 from among a number of predetermined data rates greater than two. For example, the deskew module 315 may select the input data rate to be one, two, or four clock cycles of the clock signal 440. Moreover, the data aggregation module 400 may include more than two inputs for receiving symbols and more than two outputs for outputting symbols.

In some embodiments, the controller 365 generates the enable signal 430, the select signal 435, and the clock signal 440. In other embodiments, the controller 365 generates the select signal 435 and the clock signal 440, and the data aggregation module 400 generates the enable signal 430 based on the select signal 435 and the clock signal 440. In some embodiments, the controller 365 need not generate the select signal 435. In these embodiments, the data aggregation module 400 determines a data rate at which the data aggregation module 400 receives symbols of the data stream 345 and generates the select signal 435 indicating that data rate.

In some embodiments, the controller 365 generates minimal skip ordered sets based on skip ordered sets in the data streams 345 received by the deskew units 350 in the deskew module 315. Further, the controller 365 writes (e.g., stores) the minimal skip ordered sets into the deskew buffers 405 of the deskew units 350 instead of the skip ordered sets received in the data stream 345. In some embodiments, the deskew buffers 405 include data queues and the controller 365 identifies a minimal skip ordered set first to reach a head of a data queue in a deskew buffer 405 of a deskew unit 350. Additionally, the controller 365 identifies a skip ordered set last to reach the head of a data queue in a deskew buffer 405 of a deskew unit 350 in a clock cycle of the clock signal 440. Further, the controller 365 determines a priori the subsequent clock cycle of the clock signal 440 in which a data symbol will be at the head of the data queue in the deskew unit 350. In this way, the controller 365 determines a priori when data symbols will be aligned at the heads of the data queues of the deskew buffers 405 in the deskew units 350. Because each of the deskew units 350 output a predetermined number of symbols in a clock cycle of the clock signal 440, logic circuits in the collator 360 are simplified. As a result, size and complexity of the logic circuits in collator 360 are reduced, which improves performance of the collator 360. For example, propagation delays of signals in the collator 360 may decrease which allows the collator 360 to operate at a higher frequency of the clock signal 440.

In some embodiments, the deskew unit 350 generates minimal skip ordered sets based on symbols of the corresponding data stream 345 received by the deskew unit 350. The deskew unit 350 generates a minimal skip ordered set by selectively deleting one or more symbols of a skip ordered set received from the corresponding data stream 345. In one embodiment, the data aggregation module 400 generates an optional valid signal 422 indicating whether a symbol provided from the data aggregation module 400 to the deskew buffer 405 through the data lane 420 is a valid symbol to be stored in the deskew buffer 405 of the deskew unit 350. The data aggregation module 400 outputs the valid signal 422 from the VLDA output of the data aggregation module 400 to the VLD_A input of the deskew buffer 405. If the signal 422 indicates the symbol provided from the data aggregation module 400 to the deskew buffer 405 through the data lane 420 is not a valid symbol, the deskew buffer 405 does not store the symbol. In this way, the data aggregation module 400 deletes the symbol from the corresponding data stream 345.

Additionally, the data aggregation module 400 generates an optional valid symbol 428 indicating whether a symbol provided from the data aggregation module 400 to the deskew buffer 405 through the data lane 425 is a valid symbol to be stored in the deskew buffer 405 of the deskew unit 350. The data aggregation module 400 outputs the valid signal 428 from the VLDB output of the data aggregation module 400 to the VLD_B input of the deskew buffer 405. If the signal 428 indicates the symbol provided from the data aggregation module 400 to the deskew buffer 405 through the data lane 425 is not a valid symbol, the deskew buffer 405 does not store the symbol. In this way, the data aggregation module 400 deletes the symbol from the corresponding data stream 345. In various embodiments, the collator 360 generates the data stream 130 by collating the symbols received from the deskew units 350 to reconstruct the data stream 105. In some embodiments, the collator 360 stores symbols received from the deskew units 350 and generates the data stream 105 by collating the data symbols stored in the collator 360. For example, the collator 360 may receive symbols corresponding to each deskew unit 350 by receiving the symbols from the corresponding deskew unit 350 in a clock cycle of the clock signal 440 and store the symbols in the clock cycle. Further, the collator 360 may add the symbols to the data stream 130 by interleaving and outputting the symbols stored in the collator 360 in a subsequent clock cycle of the clock signal 440. As another example, the collator 360 may receive and store symbols corresponding to each deskew unit 350 at a first edge (e.g., a rising edge) of a clock cycle of the clock signal 440. Further, the collator 360 may add the symbols to the data stream 130 at a second edge (e.g., a falling edge) of the clock cycle by interleaving and outputting the symbols stored in the collator 360 in a subsequent clock cycle of the clock signal 440.

In various embodiments, the collator 360 outputs symbols into the data stream 130 and a device external of the receiver 125 receives the data stream 130. Moreover, the data stream 130 includes data symbols and skip ordered sets properly formatted according to a communication protocol. For example, the data stream 130 may conform to a PCI-Express communication protocol. In this way, the device may identify the data symbols and the skip ordered sets in the data stream 130.

Although the receiver 125 has been described herein as generating the data streams 325 based on the data streams 115, the data streams 335 based on the data streams 325, the data streams 345 based on the data streams 335, the data streams 355 based on the data streams 335, and the data stream 130 based on the data streams 355, in various embodiments some or all of the data streams 115, the data streams 325, the data streams 335, the data streams 345, the data streams 335, and the data stream 130 are considered to be part of the same data stream. In these embodiments, components of the receiver 125 perform operations or functions on the same data stream. For example, the deserializer module 300 may deserialize symbols in the data streams 115, the decoder module 305 may decode symbols in the data streams 115, and the compensation module 310 may modify the number of symbols in skip ordered sets of the data streams 115 to compensate for different data rates of the data streams 115. Further, the deskew module 315 may generate minimal skip ordered sets based on the skip ordered sets in the data streams 115, align data symbols in the data streams 115 based on the minimal skip ordered sets, selectively add symbols to the minimal skip ordered sets during alignment of the data symbols, collate symbols in the data streams 115, and output the data streams 115 as the data stream 130.

Figure 5:
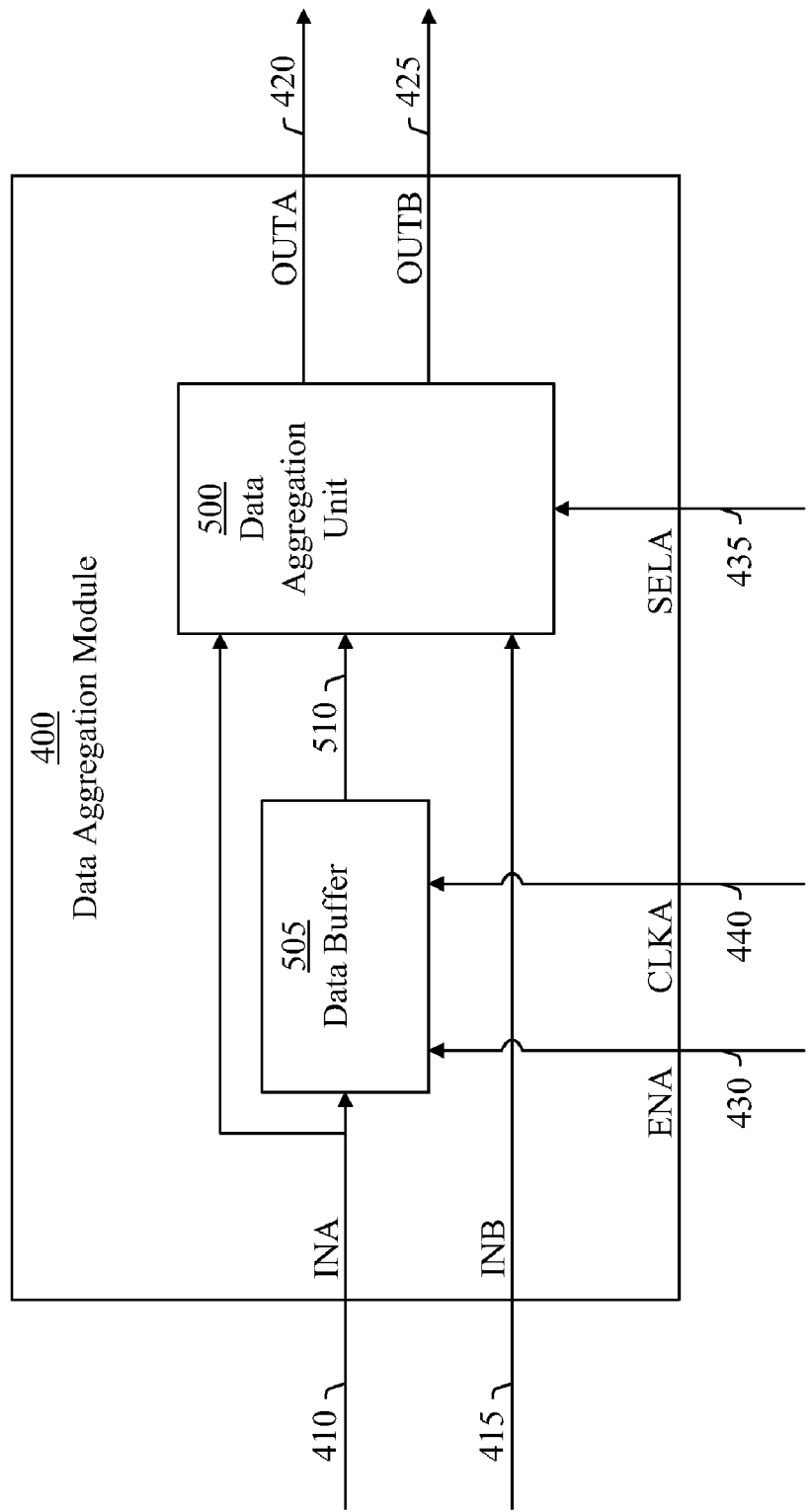
FIG. 5 is a block diagram of a data aggregation module, in accordance with an embodiment of the present invention.

FIG. 5 illustrates the data aggregation module 400, in accordance with an embodiment of the present invention. The data aggregation module 400 includes a data aggregation unit 500 and a data buffer 505 coupled (e.g., connected) to the data aggregation unit 500. In this embodiment, the data aggregation unit 500 selects the one-cycle mode or the two-cycle mode of operation for the data aggregation module 400 based on the select signal 435. In this way, the data aggregation unit 500 configures the data aggregation module 400 to operate in the selected mode.

In the two-cycle mode of operation, the data aggregation module 400 receives a first symbol and a second symbol at the input INA from the head of the data buffer 340 corresponding to the data aggregation module 400. The data aggregation module 400 receives the first symbol at the input INA in a first clock cycle of the clock signal 440 and stores the first symbol in the data buffer 505 of the data aggregation module 400 in the first clock cycle. For example, the controller 365 may assert the enable signal 430 so that the data buffer 505 of the data aggregation module 400 stores the first symbol at a rising edge of the clock signal 440 in the first clock cycle. Additionally, the data aggregation module 400 receives the second symbol at the input INA in a second clock cycle of the clock signal 440 following the first clock cycle. The data aggregation unit 500 receives the first symbol from the data buffer 505 of the data aggregation module 400 through a data lane 510 in the second clock cycle and receives the second symbol from the input INA in the second clock cycle. Further, the data aggregation unit 500 outputs the first symbol from the output OUTA and outputs the second symbol from the output OUTB in the same clock cycle. For example, the data aggregation unit 500 may output the first symbol from the output OUTA in the second clock cycle and output the second symbol from the output OUTB in the second clock cycle.

In the one-cycle mode of operation, the data aggregation module 400 receives a first symbol at the input INA from the head of the data buffer 340 corresponding to the data aggregation module 400 in a clock cycle of the clock signal 440. Additionally, the data aggregation module 400 receives a second symbol at the input INB from the data storage location immediately following the head of the corresponding data buffer 340 in the clock cycle. The data aggregation unit 500 outputs the first symbol from the output OUTA in a clock cycle of the clock signal 440 and outputs the second symbol from the output OUTB in the same clock cycle. For example, the data aggregation unit 500 may output the first symbol from the output OUTA and output the second symbol from the output OUTB in the same clock cycle in which the data aggregation module 400 receives the first symbol and the second symbol.

In some embodiments, the controller 365 asserts the enable signal 430 in the one-cycle mode of operation in the same manner in which the controller 365 asserts the enable signal 430 in the two-cycle mode of operation. In these embodiments, the data buffer 505 of the data aggregation module 400 stores symbols received from the input INA of the data aggregation module 400 in one-cycle mode but the data aggregation module 400 does not output symbols stored in the data buffer 505. In this way, logic circuits in the controller 365 for generating the enable signal 430 are simplified. In other embodiments, the controller 365 does not assert the enable signal 430 in the one-cycle mode of operation and data buffer 505 of the data aggregation module 400 does not store symbols received from the input INA of the data aggregation module 400 in the one-cycle mode. In this way, power consumption and noise are reduced in the data aggregation module 400.

Although one data buffer 505 is illustrated in FIG. 5, the data aggregation module 400 may have more than one data buffer 505 in other embodiments. In these embodiments, each of the data buffers 505 is coupled (e.g., connected) to the data aggregation unit 500 and an input (e.g., input INA or INB) of the data aggregation module 400. For example, the data aggregation module 400 may include two data buffers 505 and output four aggregated symbols in a clock cycle of the clock signal 440. As another example, the data aggregation module 400 may include three data buffers 505 and output four aggregated symbols in a clock cycle of the clock signal 440.

Figure 6:
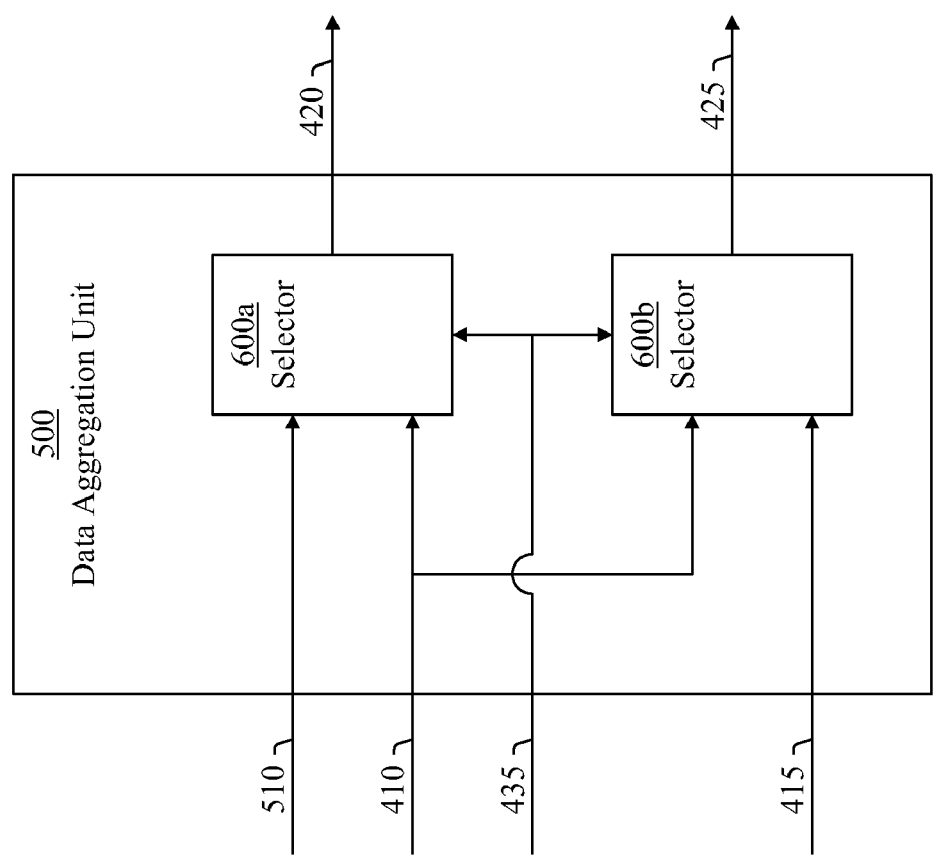
FIG. 6 is a block diagram of a data aggregation unit, in accordance with an embodiment of the present invention.

FIG. 6 illustrates the data aggregation unit 500, in accordance with an embodiment of the present invention. The data aggregation unit 500 includes selectors 600 (e.g., selectors 600a and 600b) for selecting data sources. For example, the selectors 600 may be multiplexers. The selector 600a is coupled (e.g., connected) to the input INA of the data aggregation module 400 and the data buffer 505. The selector 600a receives symbols from the input INA through the data lane 410 and symbols from the data buffer 505 through the data lane 510. Moreover, the selector 600a selects a data source from among the input INA and the data buffer 505 based on the select signal 435 and outputs a symbol from the selected data source to the output OUTA of the data aggregation module 400. The selector 600b is coupled (e.g., connected) to the input INA and the input INB of the data aggregation module 400. The selector 600b receives symbols from the input INA through the data lane 410 and symbols from the input INB through the data lane 415. Moreover, the selector 600a selects a data source from among the inputs INA and INB based on the select signal 435 and outputs a symbol from the selected data source to the output OUTA of the data aggregation module 400.

In the one-cycle mode of operation, the selector 600a selects the input INA of the data aggregation module 400 as a first data source and outputs symbols received from the input INA to the output OUTA of the data aggregation module 400. In this way, the selector 600a passes symbols received from the input INA through the data lane 410 to the output OUTA through the data lane 420. The selector 600b selects the input INB of the data aggregation module 400 as a second data source and outputs symbols received from the input INB to the output OUTB of the data aggregation module 400. In this way, the selector 600b passes symbols received from the input INB through the data lane 415 to the output OUTB through the data lane 425.

In the two-cycle mode of operation, the selector 600a selects the data buffer 505 as a first data source and outputs symbols received from the data buffer 505 to the output OUTA of the data aggregation module 400. In this way, the selector 600a passes symbols received from the data buffer 505 through the data lane 510 to the output OUTA through the data lane 420. The selector 600b selects the input INA of the data aggregation module 400 as a second data source and outputs symbols received from the input INA to the output OUTB of the data aggregation module 400. In this way, the selector 600b passes symbols received from the input INA through the data lane 410 to the output OUTB through the data lane 425.

Although two selectors 600 are illustrated in FIG. 6, the data aggregation unit 500 may have more or fewer than two selectors 600 in other embodiments. For example, the data aggregation unit 500 of the data aggregation module 400 may have four selectors 600 and the data aggregation module 400 may aggregate and output four symbols in a clock cycle of the clock signal 440.

Figure 7:
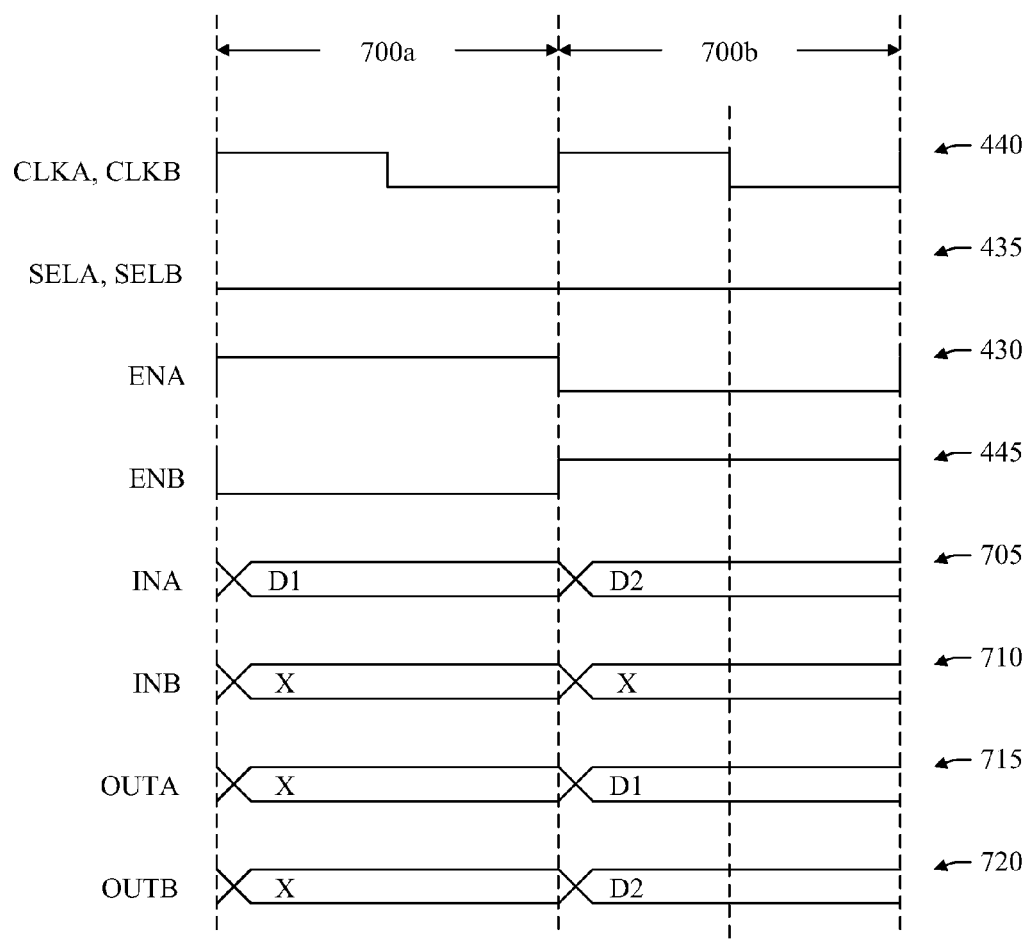
FIG. 7 is a timing diagram of signals in a deskew unit, in accordance with an embodiment of the present invention.

FIG. 7 illustrates signals in the deskew unit 350, in accordance with an embodiment of the present invention. The signals illustrated in FIG. 7 are exemplary signals in the two-cycle mode of operation of the deskew unit 350. The signals include the clock signal 440, the select signal 435, and the enable signal 430, and the enable signal 445. The signals also include a signal 705 representing symbols received at the input INA of the data aggregation module 400 and a signal 710 representing symbols received at the input INB of the data aggregation module 400. Further, the signals include a signal 715 representing symbols output from the output OUTA of data aggregation module 400 and a signal 720 representing symbols output from the output OUTB of data aggregation module 400.

As illustrated in FIG. 7, the clock signal 440 includes two clock cycles 700 (e.g., clock cycles 700a and 700b). In clock cycle 700a (e.g., a first clock cycle), the select signal 435 indicates the two-cycle mode of operation of the deskew unit 350. For example, the controller 365 may deassert the select signal 435 in a previous clock cycle of the clock signal 440 to indicate the two-cycle mode of operation of the deskew unit 350. In response to the select signal 435, the data aggregation module 400 selects the data buffer 505 as a first data source and the input INA as a second data source.

In the clock cycle 700a, the input INA of the data aggregation module 400 receives a symbol D1 (e.g., a first symbol) and the input INB of the data aggregation module 400 receives a symbol X (e.g., a "don't care" symbol). In various embodiments, the input INA receives the symbol D1 from the head of the data buffer 340 corresponding to the deskew unit 350 and the input INB receives the symbol X from the data storage location of the data buffer 340 following the head of the data buffer 340. In these embodiments, the data storage location following the head of the data buffer 340 may include a valid symbol or may be empty. If the data storage location following the head of the data buffer 340 is empty, the symbol X received at the input INB is an invalid symbol.

Also in the clock cycle 700a, the data aggregation unit 500 outputs a symbol X (e.g., a don't care symbol) from the output OUTA of the data aggregation module 400 as indicated by the signal 715 and outputs a symbol X (e.g., a don't care symbol) from the output OUTB of the data aggregation module 400 as indicated by the signal 720. Further, the enable signal 430 is asserted in the clock cycle 700a. For example, the controller 365 may assert the enable signal 430 in the clock cycle 700a.

In the clock cycle 700b, the data buffer 505 of the data aggregation module 400 stores the symbol D1 (e.g., the first symbol) at a rising edge of the clock signal 440, the input INA of the data aggregation module 400 receives a symbol D2 (e.g., a second symbol), and the input INB of the data aggregation module 400 receives a symbol X (e.g., a "don't care" symbol). In various embodiments, the input INA receives the symbol D2 from the head of the data buffer 340 corresponding to the deskew unit 350. Additionally, the input INB receives the symbol X (e.g., a don't care symbol) from the data storage location of the data buffer 340 following the head of the data buffer 340, which may be a valid symbol or an invalid symbol. The data aggregation unit 500 passes the symbol D2 from the input INA to the output OUTB of the data aggregation module 400 through the data lane 425 as indicated by the signal 720. Additionally, the data aggregation unit 500 passes the symbol D1 from the data buffer 505 to the output OUTA of the data aggregation module 400 through the data lane 420 as indicated by the signal 715.

Also in the clock cycle 700b, the deskew buffer 405 of the deskew unit 350 receives the symbol D1 (e.g., the first symbol) at the input IN_A from the data lane 420 and the symbol D2 (e.g., the second symbol) at the input IN_B from the data lane 425. Further in the clock cycle 700b, the enable signal 435 is deasserted and the enable signal 445 is asserted. For example, the controller 365 may deassert the enable signal 435 and assert the enable signal 445 in the clock cycle 700b.

In some embodiments, the deskew buffer 405 stores the symbol D1 and the symbol D2 based on the enable signal 445 in the clock cycle 700b. For example, the deskew buffer 405 may include a data queue and the deskew buffer 405 may store the symbol D1 and the symbol D2 at the tail of the data queue such that the data symbol D2 follows the symbol D1 in the data queue. In other embodiments, the deskew buffer 405 selectively stores the symbol D1 and D2 in the clock cycle 700b. In these embodiments, the deskew buffer 405 may delete one or both of the symbols D1 and D2 from the data stream 345 based on the valid signals 422 and 428 to generate a skip ordered set in the deskew buffer 405. For example, the deskew buffer 405 may delete the symbol D1 based on the valid signal 422 by not storing the skip symbol D1 in the clock cycle 700b or delete the symbol D2 based on the valid signal 428 by not storing the skip symbol D2 in the clock cycle 700b. In this way, the data aggregation module 400 generates a minimal skip ordered set in the deskew buffer 405.

In some embodiments, the deskew buffer 405 deskews symbols stored in the deskew buffer 405 in clock cycle 700a of the clock signal 440 and outputs two symbols into the data stream 355 corresponding to the deskew buffer 405 in the clock cycle 700a. In other embodiments, the deskew buffer 405 deskews symbols stored in the deskew buffer 405 in clock cycle 700a of the clock signal 440 and outputs two symbols into the data stream 355 corresponding to the deskew buffer 405 in the clock cycle 700b.

In embodiments in which the deskew module 315 generates minimal skip ordered sets, the deskew buffer 405 may output less than two symbols into the corresponding data stream 355 in a clock cycle (e.g., the clock cycle 700a or the clock cycle 700b). In these embodiments, the deskew module 315 may insert up to two symbols of a skip ordered set into the data stream 355 in the clock cycle (e.g., the clock cycle 700a or the clock cycle 700b) so that two symbols are added to the data stream 355 in the clock cycle. In this way, the collator 360 receives two symbols in the clock cycle.

Figure 8:
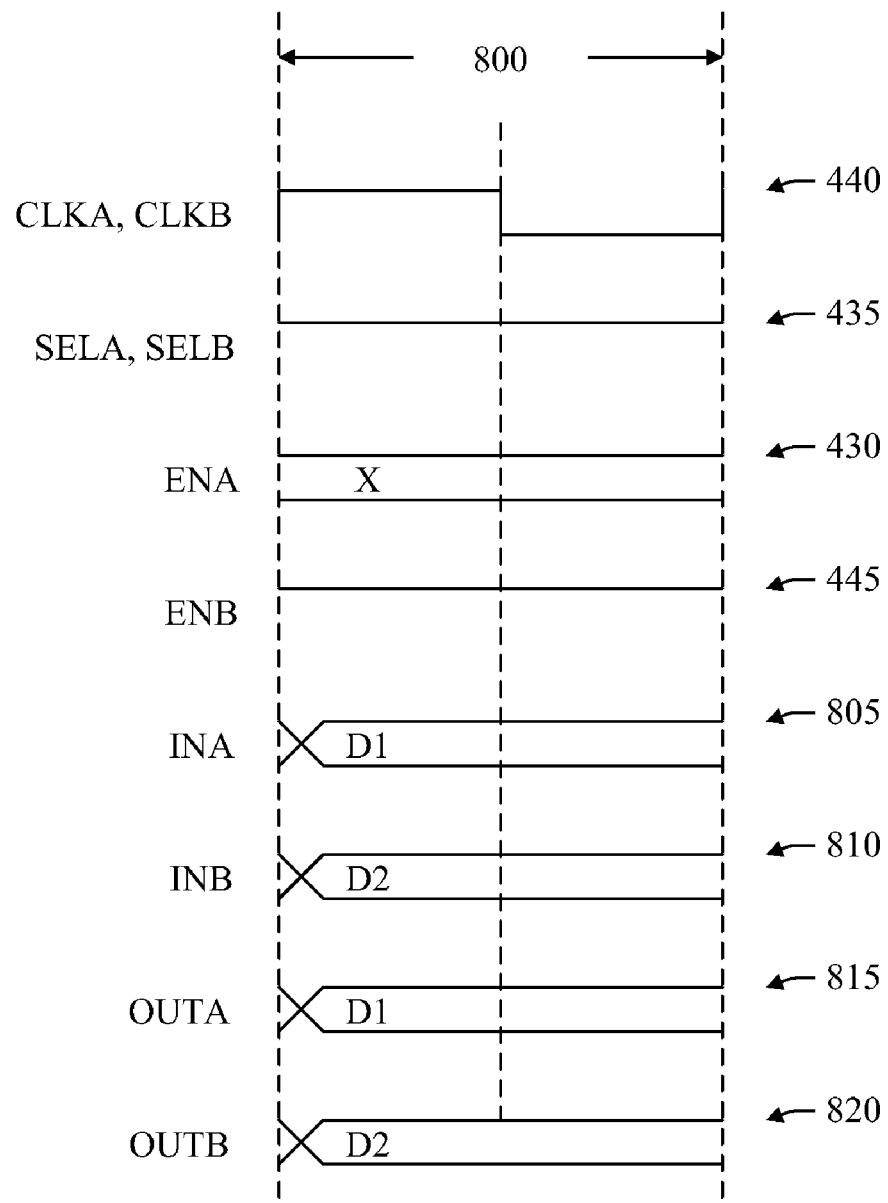
FIG. 8 is a timing diagram of signals in a deskew unit, in accordance with an embodiment of the present invention.

FIG. 8 illustrates signals in the deskew unit 350, in accordance with an embodiment of the present invention. The signals illustrated in FIG. 8 are exemplary signals in the one-cycle mode of operation of the deskew unit 350. The signals include the clock signal 440, the select signal 435, and the enable signal 430, and the enable signal 445. The signals also include a signal 805 representing symbols received at the input INA of the data aggregation module 400 and a signal 810 representing symbols received at the input INB of the data aggregation module 400. Further, the signals include a signal 815 representing symbols output from the output OUTA of data aggregation module 400 and a signal 820 representing symbols output from the output OUTB of data aggregation module 400.

As illustrated in FIG. 8, the clock signal 440 includes a clock cycle 800. In the clock cycle 800, the select signal 435 indicates the one-cycle mode of operation of the deskew unit 350. For example, the controller 365 may assert the select signal 435 in a previous clock cycle of the clock signal 440 to indicate the one-cycle mode of operation of the deskew module 315. In response to the select signal 435, the data aggregation unit 500 of the data aggregation module 400 selects the input INA as a first data source and the input INB as a second data source.

In the clock cycle 800, the input INA of the data aggregation module 400 receives a symbol D1 (e.g., a first symbol) through the data lane 410, and the input INB of the data aggregation module 400 receives a symbol D2 (e.g., a second symbol) through the data lane 415. In various embodiments, the input INA receives the symbol D1 from the head of the data buffer 340 corresponding to the deskew unit 350 and the input INB receives the symbol D2 from the data storage location of the data buffer 340 following the head of the data buffer 340.

As illustrated in FIG. 8, the enable signal 430 is represented by an X (e.g., a don't care value) because the enable signal may be asserted or deasserted in the clock cycle 800. For example, the controller 365 may assert or deassert the enable signal 430 in the one-cycle mode. If the enable signal 430 is deasserted in the clock cycle 800, the data buffer 505 does not store the symbol D1 received from the input INA in the clock cycle 800. Otherwise, if the enable signal 430 is asserted in the clock cycle 800, the data buffer 505 stores the symbol D1 received from the input INA. For example, the controller 365 may assert the enable signal 430 in both the one-cycle mode and the two-cycle mode. In either case, the data buffer 505 need not store the symbol D1 received from the input INA in the one-cycle mode.

In the clock cycle 800, the data aggregation unit 500 passes the symbol D1 received at the input INA to the output OUTA of the data aggregation module 400 through the data lane 420 as indicated by the signal 815. Additionally, the data aggregation unit 500 passes the symbol D2 received at the input INB to the output OUTB of the data aggregation module 400 through the data lane 425 as indicated by the signal 820.

The deskew buffer 405 of the deskew unit 350 receives the symbol D1 (e.g., the first symbol) at the input IN_A from the data lane 420 and receives the symbol D2 (e.g., the second symbol) at the input IN_B from the data lane 425. Additionally, the enable signal 445 is asserted in the clock cycle 800. For example, the controller 365 may assert the enable signal 445 in the clock cycle 800.

In some embodiments, the deskew buffer 405 stores the symbol D1 and the symbol D2 based on the enable signal 445 in response to the rising edge of the clock signal 440 in the clock cycle 800. For example, the deskew buffer 405 may include a data queue and the deskew buffer 405 may store the symbol D1 and the symbol D2 at the tail of the data queue such that the data symbol D2 follows the symbol D1 in the data queue. In other embodiments, the deskew buffer 405 selectively stores the symbol D1 and D2 based on the enable signal 445 in response to the rising edge of the clock signal 440 in the clock cycle 800. In these embodiments, the deskew buffer 405 may delete one or both of the symbols D1 and D2 from the data stream 345 based on the valid signals 422 and 428 to generate a skip ordered set in the deskew buffer 405. For example, the deskew buffer 405 may delete the symbol D1 based on the valid signal 422 by not storing the skip symbol D1 in the clock cycle 800 or delete the symbol D2 based on the valid signal 428 by not storing the skip symbol D2 in the clock cycle 800. In this way, the data aggregation module 400 generates a minimal skip ordered set in the deskew buffer 405.

In some embodiments, the deskew buffer 405 deskews symbols stored in the deskew buffer 405 in clock cycle 800 of the clock signal 440 and outputs two symbols into the data stream 355 corresponding to the deskew buffer 405 in the clock cycle 800. In embodiments in which the deskew module 315 generates minimal skip ordered sets, the deskew buffer 405 may output less than two symbols into the corresponding data stream 355 in the clock cycle 800. In these embodiments, the deskew module 315 may insert up to two symbols of a skip ordered set into the data stream 355 in the clock cycle 800 so that two symbols are added to the data stream 355 in the clock cycle 800.

Figure 9:
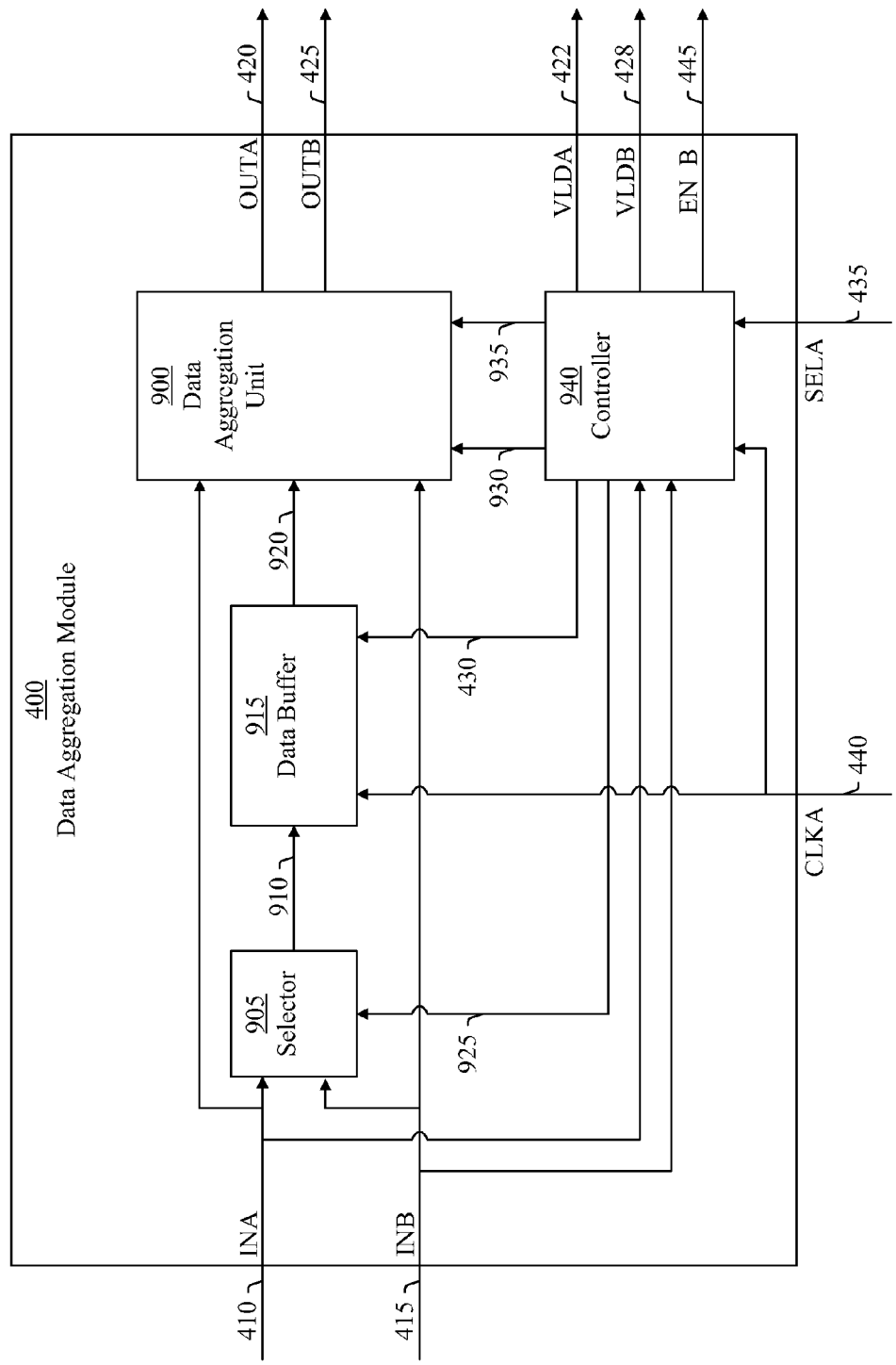
FIG. 9 is a block diagram of a data aggregation module, in accordance with an embodiment of the present invention.

FIG. 9 illustrates the data aggregation module 400, in accordance with an embodiment of the present invention. The data aggregation module 400 includes a data aggregation unit 900, a selector 905, a data buffer 915, and a controller 940. The selector 905 is coupled (e.g., connected) to the data buffer 915 and the data aggregation unit 900. The data buffer 915 is coupled (e.g., connected) data aggregation unit 900. Additionally, the controller 940 is coupled (e.g., connected) to the selector 905, the data buffer 915, and the data aggregation unit 900.

In this embodiment, the controller 940 generates a select signal 930 and a select signal 935 based on the select signal 435. The controller 940 provides the select signal 930 and the select signal 935 to the data aggregation unit 900. The data aggregation unit 900 selects the one-cycle mode of operation or the two-cycle mode of operation for the data aggregation module 400 based on the select signals 930 and 935. In this way, the data aggregation unit 900 configures the data aggregation module 400 to operate in the selected mode.

Further in this embodiment, the controller 940 generates a select signal 925 and provides the select signal 925 to the selector 905. The selector 905 passes symbols received at the inputs INA and INB of the data aggregation module 400 to the data buffer 915 based on the select signal 925. Moreover, the controller 940 generates the enable signals 430 and 445, provides the enable signal 430 to the data buffer 915, and provides the enable signal 445 to an output EN_B of the data aggregation module 400. In turn, the data aggregation module 400 outputs the enable signal 445 from the output EN_B and provides the enable signal 445 to the deskew buffer 405 of the deskew unit 350 containing the data aggregation module 400. Additionally, the controller 940 generates the valid signals 422 and 428. The controller 940 provides the valid signal 422 to the output VLDA of the data aggregation module 400 and provides the valid signal 428 to the VLDB output of the data aggregation module 400.

In this embodiment, the controller 940 determines whether any symbol received at the inputs INA and INB of the data aggregation module 400 is to be deleted from the corresponding data stream 345 to generate a minimal skip ordered set. If the controller 940 determines that a symbol is to be deleted from the data stream 345, the controller 940 enters into a skip mode of operation and generates the appropriate valid signal 422 or 428 indicating the symbol to be deleted is invalid when the data aggregation unit 900 outputs the symbol to the output OUTA or OUTB of the data aggregation module 400.

In the two-cycle mode of operation, the data aggregation module 400 receives a first symbol and a second symbol at the input INA from the head of the data buffer 340 corresponding to the data aggregation module 400. The data aggregation module 400 receives the first symbol at the input INA in a first clock cycle of the clock signal 440 and the selector 905 passes the first symbol to the data buffer 915 in the first clock cycle. In turn, the data buffer 915 stores the first symbol in the data buffer 915 of the data aggregation module 400 in the first clock cycle. For example, the controller 940 may generate the control signal 925 so that the selector 905 passes the first symbol from the input INA to the data buffer 915 and the controller 940 may assert the enable signal 430 so that the data buffer 915 stores the first symbol at a rising edge of the clock signal 440 in the first clock cycle.

Additionally, the data aggregation module 400 receives the second symbol at the input INA in a second clock cycle of the clock signal 440 following the first clock cycle. The data aggregation unit 900 receives the first symbol from the data buffer 915 of the data aggregation module 400 through a data lane 920 in the second clock cycle and receives the second symbol from the input INA in the second clock cycle. The data aggregation unit 900 outputs the first symbol from the output OUTA and outputs the second symbol from the output OUTB in the same clock cycle based on the select signals 930 and 935. For example, the data aggregation unit 900 may output the first symbol from the output OUTA in the second clock cycle and output the second symbol from the output OUTB in the second clock cycle.

In this embodiment, if the controller 940 determines that both the first symbol and the second symbol are to be deleted from the data stream 345, the controller 940 enters a first skip mode of operation. In the first skip mode, the controller 940 generates the valid signals 422 and 428 indicating that the symbols output from the outputs OUTA and OUTB of the data aggregation module 400 are invalid. As a result, the deskew buffer 405 of the deskew unit 350 does not store the symbols output from the outputs OUTA and OUTB of the data aggregation module 400. In this way, the controller 940 deletes both the first symbol and the second symbol from the data stream 345. The controller 940 then exits the first skip mode of operation.

Otherwise, if the controller 940 determines that the first symbol received at the input INA of the data aggregation module 400 in the first clock cycle is to be deleted from the data stream 345 but the second symbol received at the input INA of the data aggregation 400 in the second clock cycle is not to be deleted from the data stream 345, the controller 940 enters a second skip mode of operation. In the second skip mode, the controller 940 generates the select signal 925 so that the selector 905 passes the second symbol received at the input INA to the data buffer 915 in the second clock cycle and the data buffer 915 stores the second symbol. Additionally, the controller 940 generates the valid signals 422 and 428 indicating that the symbols output from the outputs OUTA and OUTB of the data aggregation module 400 are invalid.

In a third clock cycle (e.g., the next clock cycle) following the second clock cycle of the clock signal 440, the input INA of the data aggregation module 400 receives a third symbol of the data stream 345. Further, the controller 940 generates the control signals 930 and 935 so that the data aggregation unit 900 passes the second symbol from the data buffer 915 to the output OUTA and passes the third symbol from the input INA to the output OUTB. Additionally, the controller 940 generates the valid signals 422 and 428 indicating that the second symbol output from the output OUTA and the third symbol output from the output OUTB are valid symbols. Moreover, the controller 940 asserts the enable signal 445 in the third clock cycle of the clock signal 440 instead of the second clock cycle of the clock signal 440. In turn, the deskew buffer 405 stores the second symbol and the third symbol output from the data aggregation module 400. In this way, the controller 940 shifts the timing of the two-cycle mode by a clock cycle of the clock signal 440. The controller 940 then exits the second skip mode of operation.

Otherwise, if the controller 940 determines that the first symbol received at the input INA of the data aggregation module 400 in the first clock cycle is not to be deleted from the data stream 345 but the second symbol received at the input INA of the data aggregation module 400 in the second clock cycle is to be deleted from the data stream 345, the controller 940 enters the second skip mode of operation. In the second skip mode, the controller 940 generates the select signal 925 to pass the first symbol from the input INA of the data aggregation module 400 to the data buffer 915 and the controller 940 asserts the enable signal 430 so that the data buffer 915 stores the first symbol in the first cycle. Further, the controller 940 generates the valid signals 422 and 428 indicating that the symbols output from the outputs OUTA and OUTB of the data aggregation module 400 are invalid. In this way, the controller 940 deletes the second symbol from the data stream 435. Moreover, the controller 940 deasserts the enable signal 430 is subsequent clock cycles of the clock signal 440 until the controller 940 determines a symbol received at the input INA of the data aggregation module 400 is not to be deleted from the data stream 345. In this way, the data buffer 915 stores the first symbol in the subsequent clock cycles.

In the subsequent clock cycle in which the controller 940 determines a symbol received at the input INA of the data aggregation module 400 is not to be deleted from the data stream 345, the controller 940 generates the select signals 930 and 935 so that the data aggregation unit 900 passes the first symbol from the data buffer 915 to the output OUTA of the data aggregation module 400 and the symbol from the input INA to the output OUTB of the data aggregation module 400. Additionally, the controller 940 generates the valid signals 422 and 428 indicating that the first symbol output from the output OUTA and the symbol output from the output OUTB are valid symbols. Moreover, the controller 940 asserts the enable signal 445 in this clock cycle of the clock signal 440. In turn, the deskew buffer 405 stores the symbols output from the data aggregation module 400. In this way, the controller 940 shifts the timing of the two-cycle mode by one or more clock cycles of the clock signal 440. The controller 940 then exits the second skip mode of operation.

In the one-cycle mode of operation, the data aggregation module 400 receives a first symbol at the input INA from the head of the data buffer 340 corresponding to the data aggregation module 400 in a clock cycle of the clock signal 440. Additionally, the data aggregation module 400 receives a second symbol at the input INB from the data storage location immediately following the head of the corresponding data buffer 340 in the clock cycle. The data aggregation unit 900 outputs the first symbol from the output OUTA in a clock cycle of the clock signal 440 and outputs the second symbol from the output OUTB in the same clock cycle. For example, the data aggregation unit 900 may output the first symbol from the output OUTA and output the second symbol from the output OUTB in the same clock cycle in which the data aggregation module 400 receives the first symbol and the second symbol.

In this embodiment, if the controller 940 determines that both the first symbol and the second symbol are to be deleted from the data stream 345, the controller 940 enters a third skip mode of operation. In the third skip mode, the controller 940 generates the valid signals 422 and 428 indicating that the symbols output from the outputs OUTA and OUTB of the data aggregation module 400 are invalid. As a result, the deskew buffer 405 of the deskew unit 350 does not store the symbols output from the outputs OUTA and OUTB of the data aggregation module 400. In this way, the controller 940 deletes both the first symbol and the second symbol from the data stream 345. The controller 940 then exits the third skip mode of operation.

Otherwise, if the controller 940 determines that the first symbol received at the input INA of the data aggregation module 400 or the second symbol received at the input INB of the data aggregation module 400 is to be deleted from the data stream 345, the controller 940 enters a fourth skip mode of operation. In the fourth skip mode, the controller 940 generates the select signal 925 so that the selector 905 passes the symbol that is not to be deleted from the data stream 345 from the appropriate input INA or INB of the data aggregation module 400 to the data buffer 915 in the clock cycle and the data buffer 915 stores the symbol. Additionally, the controller 940 generates the valid signals 422 and 428 indicating that the symbols output from the outputs OUTA and OUTB of the data aggregation module 400 are invalid.

In the next clock cycle of the clock signal 440, the input INA of the data aggregation module 400 receives a symbol of the data stream 345 and the input INB of the data aggregation module 400 receives a symbol of the data stream. If the controller 940 determines that both symbols received by the data aggregation module 400 in the clock cycle are to be deleted from the data stream 345, the controller 940 generates the valid signals 422 and 428 indicating that the symbols output from the outputs OUTA and OUTB of the data aggregation module 400 are invalid. The controller 940 operates in this manner until the data aggregation module 400 receives a symbol at the input INA or the input INB in a subsequent clock cycle of the clock signal 440 that is not to be deleted from the data stream 345.

If the controller 940 determines in a subsequent clock cycle of the clock signal 440 that both symbol received at the input INA of the data aggregation module 400 and the symbol received at the input INB of the data aggregation module 400 are not to be deleted from the data stream 345, the controller 940 generates the controls signals 930 and 935 so that the data aggregation unit 900 passes the symbol from the data buffer 915 to the output OUTA of the data aggregation module 400 and the symbol from the input INA to the output OUTB of the data aggregation module 400. Additionally, the controller 940 generates the valid signals 422 and 428 indicating that the symbols output from the outputs OUTA and OUTB of the data aggregation module 400 are valid symbols. In turn, the deskew buffer 405 stores the symbols output from the data aggregation module 400 in the clock cycle. Further, the controller 940 generates the control signal 925 so that the selector 905 passes the symbol from the input INB to the data buffer 915 in the clock cycle and the data buffer 915 stores the symbol. The controller 940 operates in this manner until the data aggregation module 400 receives a symbol to be deleted from the data stream 345 in a subsequent clock cycle of the clock signal 440.

If the controller 940 determines in a subsequent clock cycle of the clock signal 440 that a symbol received at one of the inputs INA or INB of the data aggregation module 400 is to be deleted from the data stream 345, the controller 940 generates the controls signals 930 and 935 so that the data aggregation unit 900 passes the symbol from the data buffer 915 to the output OUTA of the data aggregation module 400 and the symbol that is not to be deleted from the data stream 435 from the appropriate input INA or INB of the data aggregation module 400 to the output OUTB of the data aggregation module 400. In this way, the controller 940 deletes the other symbol received by the data aggregation module 400 in the clock cycle. Additionally, the controller 940 generates the valid signals 422 and 428 indicating that the symbols output from the outputs OUTA and OUTB of the data aggregation module 400 are valid symbols. In turn, the deskew buffer 405 stores the symbols output from the data aggregation module 400 in the clock cycle. The controller 940 then exits the fourth skip mode of operation.

Although one data buffer 915 is illustrated in FIG. 9, the data aggregation module 400 may have more than one data buffer 915 in other embodiments. In these embodiments, each of the data buffers 915 is coupled (e.g., connected) to the selector 905 and the data aggregation unit 900. For example, the data aggregation module 400 may include two data buffers 915 and output four aggregated symbols in a clock cycle of the clock signal 440. As another example, the data aggregation module 400 may include three data buffers 915 and output four aggregated symbols in a clock cycle of the clock signal 440.

Figure 10:
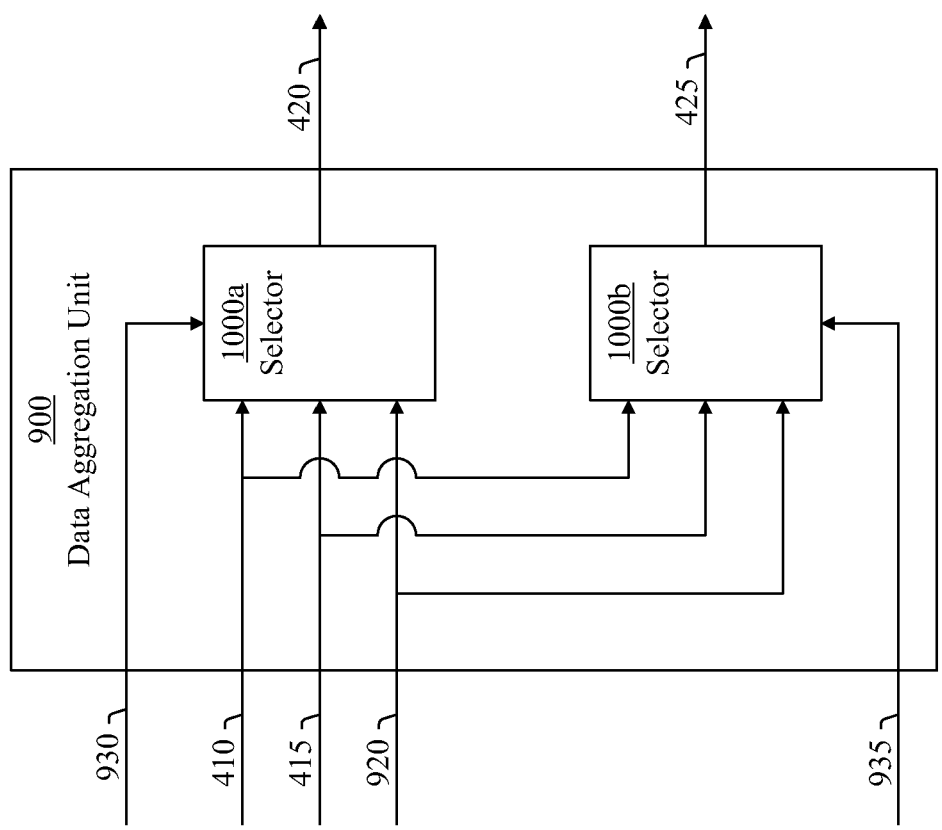
FIG. 10 is a block diagram of a data aggregation unit, in accordance with an embodiment of the present invention.

FIG. 10 illustrates the data aggregation unit 900, in accordance with an embodiment of the present invention. The data aggregation unit 900 includes selectors 1000 (e.g., selectors 1000a and 1000b) for selecting data sources. For example, the selectors 1000 may be multiplexers. Each of the selectors 1000 is coupled (e.g., connected) to the data buffer 915 and the inputs INA and INB of the data aggregation module 400. Further, each of the selectors 1000 receives symbols from the input INA of the data aggregation module 400 through the data lane 410, symbols from the input INB of the data aggregation module 400 through the data lane 415, and symbols from the data buffer 915 of the data aggregation module 400 through the data lane 920.

The selector 1000a selects a data source from among the data buffer 915 and the inputs INA and INB based on the select signal 930 and passes a symbol from the selected data source to the output OUTA of the data aggregation module 400. The selector 1000b selects a data source from among the data buffer 915 and the inputs INA and INB based on the select signal 935 and passes a symbol from the selected data source to the output OUTA of the data aggregation module 400. In other embodiments, the data aggregation unit 900 may have more or fewer than two selectors 1000.

Figure 11:
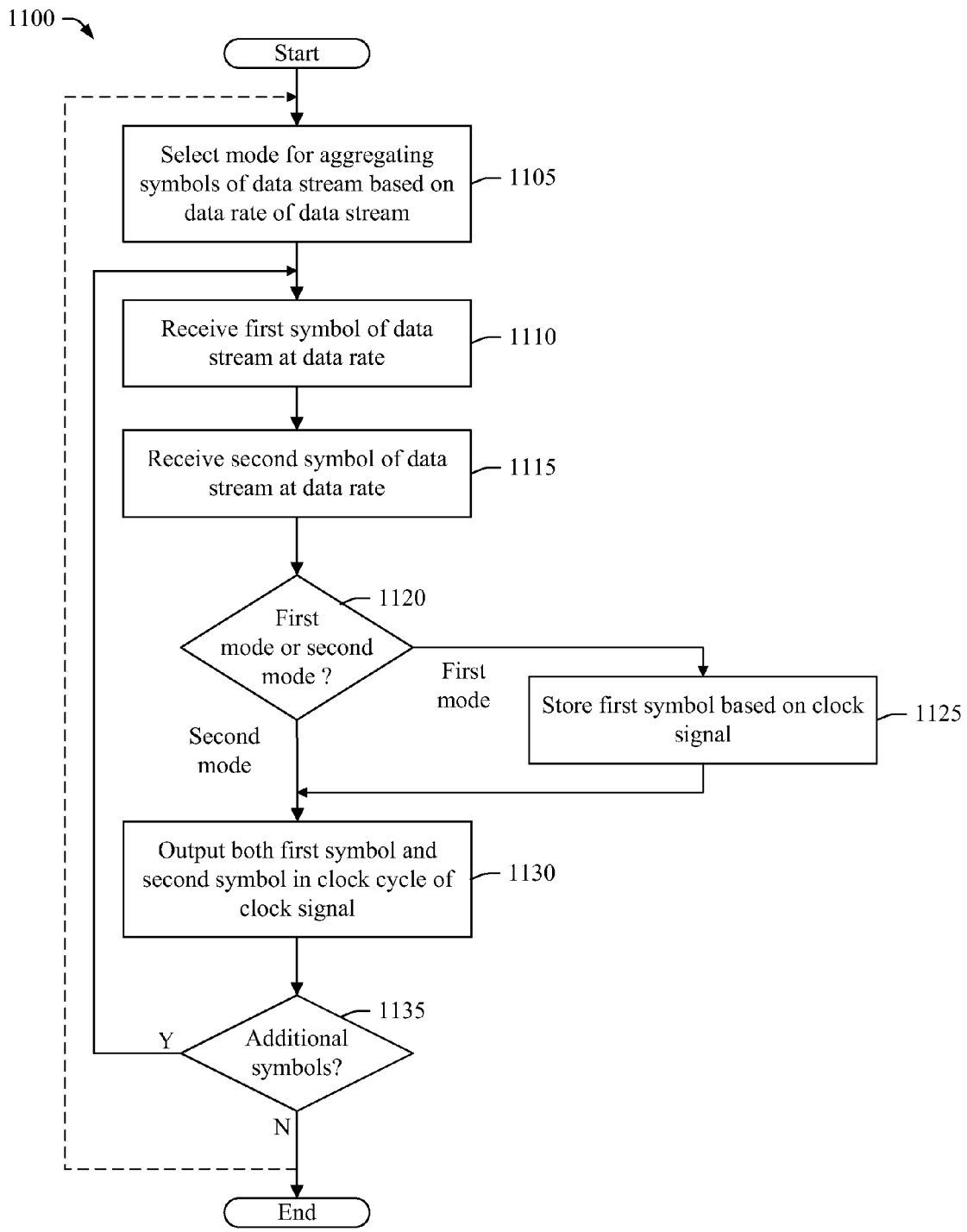
FIG. 11 is a flow chart of a method of aggregating symbols of a data stream, in accordance with an embodiment of the present invention.

FIG. 11 illustrates a method 1100 for aggregating symbols of a data stream, in accordance with an embodiment of the present invention. In step 1105, a mode of operation is selected for aggregating symbols of a data stream based on a data rate of the data stream. In various embodiments, the data aggregation unit 500 of the deskew unit 350 selects a mode of operation of the deskew unit 350 for aggregating symbols of the data stream 345 corresponding to the deskew unit 350 based on the select signal 435. The select signal indicates a data rate at which the deskew unit 350 receives symbols of the corresponding data stream 345. In this way, the data aggregation unit 500 selects the mode of operation of the deskew unit 350 based on the data rate at which the deskew unit 350 receives symbols of the corresponding data stream 345. In some embodiments, the data aggregation unit 500 of the deskew unit 350 selects either a first mode of operation for aggregating symbols of the corresponding data stream 345 in more than one clock cycle (e.g., multiple clock cycles) of the clock signal 440 or a second mode of operation for aggregating symbols of the corresponding data stream 345 in a clock cycle (e.g., a single clock cycle) of the clock signal 440.

In various embodiments, the data aggregation unit 500 selects either a two-cycle mode of operation (e.g., a first mode) or a one-cycle mode of operation (e.g., a second mode) based on the select signal 435. In this process, the data aggregation unit 500 selects a source of a first symbol of the data stream 345 corresponding to the data aggregation module 400 and a source of a second symbol of the data stream 345. If the select signal 435 indicates an input data rate of one symbol per clock cycle of the clock signal 440 for receiving symbols of the data stream 345 corresponding to the data aggregation module 400, the data aggregation unit 500 selects the two-cycle mode. Moreover, the data aggregation unit 500 selects the two-cycle module by selecting the data buffer 505 of the data aggregation module 400 as a source of the first symbol and selecting the input INA of the data aggregation module 400 as the source of the second symbol.

Otherwise, if the select signal 435 indicates an input data rate of two symbols per clock cycle of the clock signal 440 for receiving symbols of the data stream 345 corresponding to the data aggregation module 400, the data aggregation unit 500 selects the one-cycle mode. Moreover, the data aggregation unit 500 selects the one-cycle module by selecting the input INA of the data aggregation module 400 as a source of the first symbol and selecting the input INB of the data aggregation module 400 as the source of the second symbol. The method 1000 then proceeds to step 1110.

In step 1110, a first symbol of the data stream is received at the input data rate. In various embodiments, the data aggregation module 400 receives the first symbol of the data stream 345 corresponding to the data aggregation module 400 from the head of the data buffer 340 corresponding to the data aggregation module 400. If the mode of the data aggregation module 400 is the one-cycle mode, the data aggregation module 400 receives the first symbol at the input INA in a clock cycle 800 of the clock signal 440. Otherwise, if the mode of the data aggregation module 400 is the two-cycle mode, the data aggregation module 400 receives the first symbol at the input INA in a clock cycle 700a (e.g., a first clock cycle) of the clock signal 440. The method 1000 then proceeds to step 1115.

In step 1115, a second symbol of the data stream is received at the input data rate. In various embodiments, the data aggregation module 400 receives the second symbol of the data stream 345 corresponding to the data aggregation module 400 from the data buffer 340 corresponding to the data aggregation module 400. If the mode of the data aggregation module 400 is the one-cycle mode, the data aggregation module 400 receives the second symbol at the input INB in the clock cycle 800 of the clock signal 440 from the data storage location following the head of the data buffer 340. Otherwise, if the mode of the data aggregation module 400 is the two-cycle mode, the data aggregation module 400 receives the second symbol at the input INA in a clock cycle 700b (e.g., a second clock cycle) following the clock cycle 700a (e.g., the first clock cycle) of the clock signal 440. The method 1000 then proceeds to step 1120.

In step 1120, a determination is made as to whether the selected mode is the first mode or the second mode. In various embodiments, the controller 365 determines whether the mode of the data aggregation module 400 is the first mode (e.g., the two-cycle mode) or the second mode (e.g., the one-cycle mode) and generates the select signal 435, the enable signal 430, and the enable signal 445 based on the determined mode. For example, the controller 365 may determine the mode of the data aggregation module 400 based on a user input.

In some embodiments, the data aggregation unit 500 of the data aggregation module 400 determines whether the mode of the data aggregation mode 400 is the one-cycle mode or the two-cycle mode based on the select signal 435. For example, the data aggregation unit 500 may determine whether the mode of the data aggregation module 400 is the one-cycle mode or the two-cycle mode by selecting either the one-cycle mode or the two-cycle mode based on the select signal 435 in step 1105. If the mode of the data aggregation module 400 is the first mode (e.g., the two-cycle mode), the method 1000 proceeds to step 1125. Otherwise, if the mode of the data aggregation module 400 is the second mode (e.g., the one-cycle mode), the method 1000 proceeds to step 1130.

In step 1125, arrived at from the determination in step 1120 that the selected mode is the two-cycle mode, the first symbol is stored based on a clock signal. In various embodiments, the data buffer 505 of the data aggregation module 400 stores the first symbol based on the clock signal 440 by storing the first symbol in the first clock cycle 700a of the clock signal 440. In some embodiments, the data buffer 505 stores the first symbol in response to a rising edge of the clock signal 440 in the first clock cycle 700a. In other embodiments, the controller 365 asserts the enable signal 430 in the first clock cycle 700a and the data buffer 505 stores the first symbol in response to a rising edge of the clock signal 440 in the first clock cycle 700a when the enable signal 430 is asserted. The method 1000 then proceeds to step 1130.

In step 1130, arrived at from the determination in step 1120 that the selected mode is the one-cycle mode or from step 1125 in which the first symbol is stored, the first symbol and the second symbol are output in a clock cycle of the clock signal. In various embodiments, the data aggregation module 400 outputs the first symbol from the output OUTA in a clock cycle of the clock signal 440 and outputs the second symbol from the output OUTB in the clock cycle (e.g., the same clock cycle). If the mode of the data aggregation module 400 is the one-cycle mode, the data aggregation unit 500 of the data aggregation module 400 passes the first symbol from the input INA of the data aggregation module 400 to the output OUTA of the data aggregation module 400 in the clock cycle 800. Additionally, the data aggregation module 400 passes the second symbol from the input INB of the data aggregation module 400 to the output OUTB of the data aggregation module 400 in the clock cycle 800. In turn, the data aggregation module 400 outputs the first symbol from the output OUTA to the data lane 420 in the clock cycle 800 and outputs the second symbol from the output OUTB to the data lane 425 in the clock cycle 800. In this way, the data aggregation module 400 outputs both the first symbol and the second symbol in the clock cycle 800.

Otherwise, if the mode of the data aggregation module 400 is the two-cycle mode, the data aggregation unit 500 passes the first symbol from the data buffer 505 of the data aggregation module 400 to the output OUTA of the data aggregation module 400 in the clock cycle 700b (e.g., the second clock cycle). Additionally, the data aggregation unit 500 of the data aggregation module 400 and passes the second symbol from the input INA of the data aggregation module 400 to the output OUTB of the data aggregation module 400 in the clock cycle 700b. In turn, the data aggregation module 400 outputs the first symbol from the output OUTA to the data lane 420 in the clock cycle 700b and outputs the second symbol from the output OUTB to the data lane 425 in the clock cycle 700b. In this way, the data aggregation module 400 outputs both the first symbol and the second symbol in the clock cycle 700b. The method 1000 then proceeds to step 1135.

In step 1135, a determination is made as to whether additional symbols of the data stream are to be aggregated. In various embodiments, the controller 365 determines whether additional symbols of the data stream 345 corresponding to the deskew unit 350 are to be aggregated. If additional symbols of the data stream 345 are to be aggregated, the method 1100 returns to step 1110, otherwise the method 1100 ends. Alternatively, the method 1100 may return to step 1105 if additional symbols of the data stream 345 are not to be aggregated. In this way, the deskew unit 350 may aggregate symbols of the data stream 345 at a different data rate or aggregate symbols of another data stream 345 received by the deskew unit 350.

In various embodiments, one or more of the steps 1105-1100 of the method 1135 may be performed in a different order than that described above and illustrated in FIG. 11. In some embodiments, the method 1135 may include more or fewer steps than the steps 1105-1135. For example, one or more of the steps 1110-1135 may involve generating minimal skip ordered sets, as described herein. In various embodiments, two or more of the steps 1105-1135 may be performed in parallel with each other or substantially simultaneously with each other.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A data aggregation module comprising:
a plurality of inputs configured to receive a first symbol and a second symbol of a data stream at a data rate, the second symbol following the first symbol in the data stream;
a data aggregation unit coupled to the plurality of inputs and configured to select a mode of operation for the data aggregation unit based on the data rate, the data aggregation unit configurable to operate in a first mode for aggregating the first symbol and the second symbol in multiple clock cycles of a clock signal, the data aggregation unit further configurable to operate in a second mode for aggregating the first symbol and the second symbol in a clock cycle of the clock signal, the data aggregation unit further configured to output both the first symbol and the second symbol in a clock cycle of the clock signal; and
a data buffer coupled to the data aggregation unit and at least one input of the plurality of inputs, the data buffer configured to store the first symbol based on the clock signal if the selected mode is the first mode.

2. The data aggregation module of claim 1, wherein the data aggregation unit is further configured to select the first mode if the data rate is one symbol per clock cycle of the clock signal.

3. The data aggregation module of claim 2, wherein the data aggregation unit is further configured to select the second mode if the data rate is two symbols per clock cycle of the clock signal.

4. The data aggregation module of claim 1, wherein the data aggregation unit is further configured to receive the first symbol at a first input of the plurality of inputs in a first clock cycle of the clock signal and receive the second symbol at a second input of the plurality of inputs in the first clock cycle.

5. The data aggregation module of claim 4, wherein the data aggregation unit is further configured to output both the first symbol and the second symbol in the first clock cycle if the selected mode is the second mode.

6. The data aggregation module of claim 4, wherein the data buffer is further configured to store the first symbol in the first clock cycle, the data aggregation unit is further configured to receive the second symbol at the first input in a second clock cycle of the clock signal following the first clock cycle, and the data aggregation unit is further configured to output both the first symbol and the second symbol in the second clock cycle.

7. The data aggregation module of claim 1, wherein the data aggregation unit is further configured to generate a minimal skip ordered set based on symbols received at the plurality of inputs.

8. A system comprising:
a compensation buffer configured to output a first symbol and a second symbol of a data stream at a data rate, the second symbol following the first symbol in the data stream;
a data aggregation module coupled to the compensation buffer and comprising:
a plurality inputs configured to receive the first symbol and the second symbol at the data rate;
a data aggregation unit coupled to the plurality of inputs and configured to select a mode of operation for the data aggregation unit based on the data rate, the data aggregation unit configurable to operate in a first mode for aggregating the first symbol and the second symbol in multiple clock cycles of a clock signal, the data aggregation unit further configurable to operate in a second mode for aggregating the first symbol and the second symbol in a clock cycle of the clock signal, the data aggregation unit further configured to output both the first symbol and the second symbol in a clock cycle of the clock signal; and
a data buffer coupled to the data aggregation unit and at least one input of the plurality of inputs, the data buffer configured to store the first symbol based on the clock signal if the selected mode is the first mode; and
a deskew buffer coupled to the data aggregation module and configured to receive the first symbol and the second symbol from the data aggregation module in a clock cycle of the clock signal, the deskew buffer further configured to deskew symbols received from the data aggregation module.

9. The system of claim 8, wherein the data aggregation unit is further configured select the first mode if the data rate is one symbol per clock cycle of the clock signal.

10. The system of claim 9, wherein the data aggregation unit is further configured to select the second mode if the data rate is two symbols per clock cycle of the clock signal.

11. The system of claim 8, wherein the data aggregation unit is further configured to receive the first symbol at a first input of the plurality of inputs in a first clock cycle of the clock signal and receive the second symbol at a second input of the plurality of inputs in the first clock cycle.

12. The system of claim 11, wherein the data aggregation unit is further configured to output both the first symbol and the second symbol in the first clock cycle if the selected mode is the second mode.

13. The system of claim 11, wherein the data buffer is further configured to store the first symbol in the first clock cycle, the data aggregation unit is further configured to receive the second symbol at the first input in a second clock cycle of the clock signal following the first clock cycle, and the data aggregation unit is further configured to output both the first symbol and the second symbol in the second clock cycle if the selected mode is the first mode.

14. The system of claim 8, wherein the deskew buffer is further configured to store the first symbol and the second symbol received from the data aggregation module.

15. The system of claim 8, wherein the deskew buffer is further configured to selectively store the first symbol and the second symbol received from the data aggregation module.

16. The system of claim 15, wherein the deskew buffer is further configured to generate a minimal skip ordered set based on the first symbol and the second symbol and store the minimal skip ordered set.

17. The system of claim 8, wherein the data aggregation module is further configured to generate a minimal skip ordered set based on symbols received at the plurality of inputs.

18. A method of aggregating symbols of a data stream, the method comprising:
selecting a mode for aggregating symbols of a data stream based on a data rate of the data stream by selecting a first mode if the data rate is one symbol per clock cycle of a clock signal and selecting a second mode if the data rate is at least two symbols per clock cycle of the clock signal;
receiving a first symbol of the data stream at the data rate;
storing the first symbol based on the clock signal if the selected mode is the first mode;
receiving a second symbol of the data stream at the data rate, the second symbol following the first symbol in the data stream; and outputting both the first symbol and the second symbol in a clock cycle of the clock signal.

19. The method of claim 18, wherein selecting the mode for aggregating the symbols of the data stream comprises:
   selecting the first mode if the data rate is one symbol per clock cycle of the clock signal; and
   selecting the second mode if the data rate is two symbols per clock cycle of the clock signal.

20. The method of claim 18, wherein receiving the first symbol and the second symbol of the data stream at the data rate comprises receiving the first symbol in a first clock cycle of the clock signal and further comprises receiving the second symbol in a second clock cycle of the clock signal following the first clock cycle if the selected mode is the first mode, and wherein outputting both the first symbol and the second symbol in the clock cycle of the clock signal comprises outputting both the first symbol and the second symbol in the second clock cycle if the selected mode is the first mode.

21. The method of claim 18, wherein receiving the first symbol and the second symbol of the data stream at the data rate comprises receiving the first symbol and the second symbol in a first clock cycle of the clock signal if the selected mode is the second mode, and wherein outputting both the first symbol and the second symbol in the clock cycle of the clock signal comprises outputting both the first symbol and the second symbol in the first clock cycle if the selected mode is the second mode.

22. The method of claim 18, further comprising deskewing the first symbol and the second symbol.

23. The method of claim 18, further comprising:
   receiving a plurality of symbols of the data stream at the data rate; and
   generating a minimal skip ordered set based on the plurality of symbols.

* * * * *